US009742341B2

(12) United States Patent
Watabu et al.

(10) Patent No.: US 9,742,341 B2
(45) Date of Patent: Aug. 22, 2017

(54) AC MOTOR DRIVE SYSTEM

(71) Applicant: Mitsubishi Electric Corporation, Chiyoda-ku, Tokyo (JP)

(72) Inventors: Kazuyoshi Watabu, Tokyo (JP); Akiko Tabuchi, Tokyo (JP); Yoshinori Kanda, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/318,731

(22) PCT Filed: Jun. 19, 2014

(86) PCT No.: PCT/JP2014/066332
§ 371 (c)(1),
(2) Date: Dec. 14, 2016

(87) PCT Pub. No.: WO2015/194013
PCT Pub. Date: Dec. 23, 2015

(65) Prior Publication Data
US 2017/0149369 A1    May 25, 2017

(51) Int. Cl.
*H02P 27/00*   (2006.01)
*H02P 27/06*   (2006.01)
*H02J 7/00*    (2006.01)

(52) U.S. Cl.
CPC .............. *H02P 27/06* (2013.01); *H02J 7/007* (2013.01)

(58) Field of Classification Search
CPC .. B60L 11/1861; B60L 1/20; B60L 2240/527; B60L 3/0046; B60L 11/1811;
(Continued)

(56) References Cited

U.S. PATENT DOCUMENTS 7,042,178 B2 *   5/2006   Yamada ................. H02P 23/07
                                                         318/34
7,227,323 B2 *   6/2007   Yamada ................ H02M 5/458
                                                         187/290
(Continued)

FOREIGN PATENT DOCUMENTS

JP   03-128698 A    5/1991
JP   07-232872 A    9/1995
(Continued)

OTHER PUBLICATIONS

Notification of Reason for Refusal for TW 104111205, dated Apr. 27, 2016.
(Continued)

*Primary Examiner* — Bentsu Ro
*Assistant Examiner* — Thai Dinh
(74) *Attorney, Agent, or Firm* — Sughrue Mion, PLLC; Richard C. Turner

(57) ABSTRACT

An AC motor drive motor system includes a charge and discharge controller controlling a charging and discharging circuit based on a DC voltage value on the output side of a converter and a charging and discharging current value of a power storage device. The charge and discharge controller, when regenerative power via an inverter from an AC motor exceeds a power threshold, charges the power storage device such that the DC voltage value becomes a voltage threshold corresponding to the power threshold. When regenerative power is the power threshold or less, the converter performs regeneration when the DC voltage value reaches a regeneration start voltage threshold or higher, and ends regeneration when the DC voltage value reaches a regeneration end voltage threshold or lower. The DC-voltage-value time averaged value during regeneration is set lower than that at (Continued)

no-load time when the converter does not perform power supply and regeneration.

8 Claims, 18 Drawing Sheets

(58) Field of Classification Search
CPC ... B60L 11/1864; H02M 1/36; H02M 7/5387; H02P 27/06; H02P 3/14
USPC .. 318/139, 504, 400.26, 400.3, 400.31, 722, 318/430, 450, 456, 507
See application file for complete search history.

(56) References Cited

U.S. PATENT DOCUMENTS

| | | | | |
|---|---|---|---|---|
| 7,868,569 B2* | 1/2011 | Iwashita | ............... | H02J 7/345 318/376 |
| 8,143,836 B2* | 3/2012 | Iwashita | ............... | H02J 7/345 318/139 |
| 2002/0189906 A1* | 12/2002 | Tominaga | ............... | B66B 1/30 187/290 |
| 2010/0192788 A1 | 8/2010 | Tanaka et al. | | |
| 2015/0365037 A1 | 12/2015 | Watabu et al. | | |
| 2016/0226423 A1 | 8/2016 | Watabu et al. | | |

FOREIGN PATENT DOCUMENTS

| | | |
|---|---|---|
| JP | 11-289794 A | 10/1999 |
| JP | 2010-178584 A | 8/2010 |
| JP | 2012-239252 A | 12/2012 |
| JP | 5389302 B1 | 1/2014 |
| WO | 2015/049746 A1 | 4/2015 |

OTHER PUBLICATIONS

Japanese Office Action for JP 2015-519669, dated Jun. 30, 2015.
International search Report for PCT/JP2014/066332, dated Sep. 9, 2014.

* cited by examiner

FIG.3
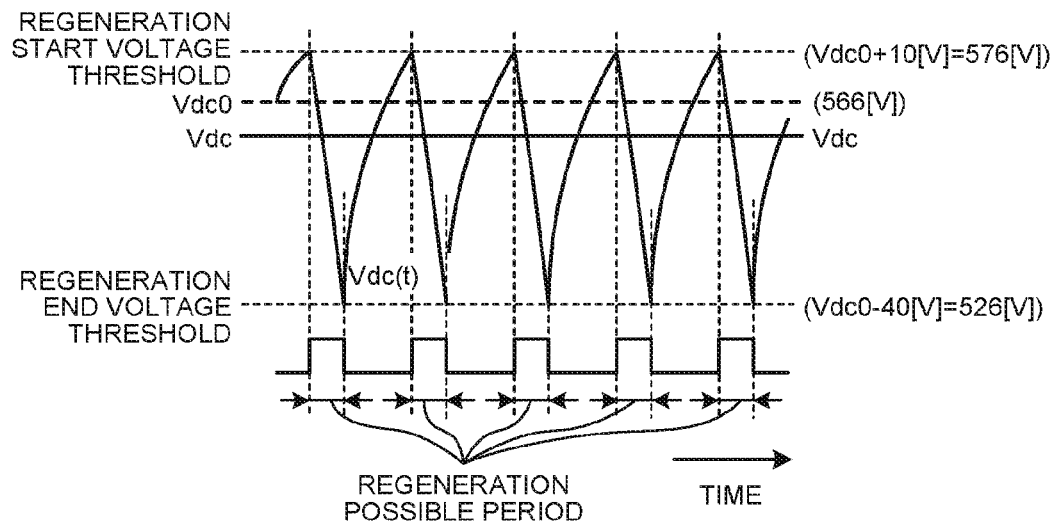
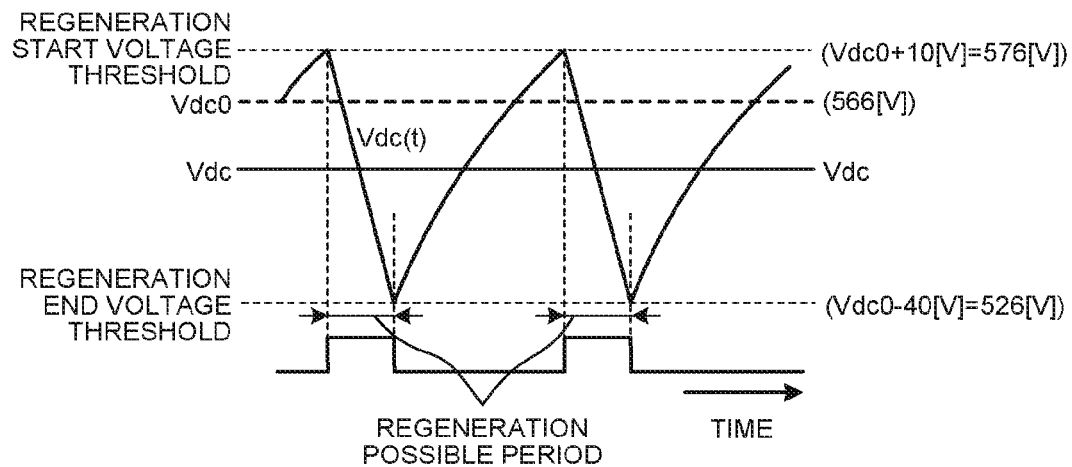

US 9,742,341 B2

AC MOTOR DRIVE SYSTEM

This is a National Stage of International Application No. PCT/JP2014/066332 filed Jun. 19, 2014, the contents of all of which are incorporated herein by reference in their entirety.

FIELD

The present invention relates to an AC motor drive system.

BACKGROUND

Example configurations of conventional AC motor drive systems include an AC motor drive system in which an inverter and a charging and discharging circuit are connected in parallel with each other to a DC bus on the output side of a converter that converts AC power from a system power supply into DC power via a smoothing capacitor. The inverter converts DC power into AC power of a voltage value and a frequency different from those of the system power supply to drive the AC motor, and the charging and discharging circuit is used for charging and discharging a power storage device that stores and releases DC power.

For example, Patent Literature 1 discloses a technique of controlling, on the basis of the voltage value in a DC bus that rises due to the regenerative power from an AC motor, the peak of power regenerated for a system power supply via a converter by charging a power storage device with part of the regenerative power, and a technique of, on the basis of the DC bus voltage value that drops due to the power consumption of the AC motor during powering of the AC motor, controlling the peak of the power supplied from the system power supply via the converter by discharging power stored in the power storage device. According to the techniques described in Patent Literature 1, there is a distinct difference in the states where the DC bus voltage value rises during regeneration of the AC motor and where the DC bus voltage value drops during powering of the AC motor when compared with the DC bus voltage value when the AC motor is performing neither a powering operation nor a regenerative operation, i.e., when the AC motor is unloaded. On the basis of this difference, the peaks of powering power passing from the system power supply to the AC motor through the converter and regenerative power passing from the AC motor to the system power supply through the converter are controlled by charging and discharging the power storage device. For lowering the costs and extending the useful lives of components of a smoothing capacitor, a converter, and an inverter connected to a DC bus by relaxing withstand voltage specifications, it is preferable to reduce the rise of the DC bus voltage value during AC motor regeneration or to prevent the rise, and it is more preferable that the DC bus voltage value drop below that at no-load time.

CITATION LIST

Patent Literature

Patent Literature 1: JP 5389302 B1

SUMMARY

Technical Problem

However, the above-described conventional techniques have a problem of being unable to determine whether the converter is in a state of regenerating power for the system power supply or in a state of being supplied with power from the system power supply when the DC bus voltage value during AC motor regeneration drops below that at no-load time.

The present invention has been made in view of the above, and has an object of providing an AC motor drive system in which a converter reliably regenerates power to a system power supply even when a DC bus voltage value drops below a DC bus voltage value when an AC motor is unloaded during AC motor regeneration.

Solution to Problem

In order to solve the above problem and attain the object, an aspect of the present invention is an AC motor drive system including: a converter that supplies DC power; an inverter that converts the DC power into AC power; a DC bus that connects the converter and the inverter; an AC motor that is driven by the AC power; a DC voltage value detector that detects a DC voltage value on an output side of the converter; a power storage device that stores the DC power from the DC bus and releases the stored DC power to the DC bus; a charging and discharging circuit that is connected to the DC bus and is in parallel with the inverter, and charges and discharges the power storage device; a charging and discharging current value detector that detects a charging and discharging current value of the power storage device; and a charge and discharge controller that outputs a control signal to control the charging and discharging circuit on a basis of the DC voltage value and the charging and discharging current value. When regenerative power via the inverter of regenerative power from the AC motor exceeds a predetermined power threshold, the charge and discharge controller causes the power storage device to be charged such that the DC voltage value becomes a voltage threshold corresponding to the power threshold, and the converter has a function of performing a regeneration operation when the DC voltage value reaches a predetermined regeneration start voltage threshold or higher and ending the regeneration operation when the DC voltage value reaches a predetermined regeneration end voltage threshold or lower, on the regenerative power via the inverter lower than or equal to the power threshold. In the converter, a time average value of the DC voltage value during the regeneration operation is a voltage value lower than the DC voltage value at no-load time when the converter does not perform power supply and regeneration.

Advantageous Effects of Invention

An AC motor drive system according to the present invention has an effect of being able to provide an AC motor drive system in which a converter reliably regenerates power even when a DC bus voltage value drops below a DC bus voltage value when an AC motor is unloaded during AC motor regeneration.

BRIEF DESCRIPTION OF DRAWINGS

FIG. 3 is a schematic diagram illustrating variations of a DC bus voltage value Vdc(t) during an operation in an intermittent regeneration mode when a converter is a power supply regeneration type converter according to the first embodiment.

DESCRIPTION OF EMBODIMENTS

Hereinafter, embodiments of an AC motor drive system according to the present invention will be described in detail below with reference to the drawings. This invention is not limited to the embodiments. In the following description, units of physical quantities are specified, but the present invention is not limited to the units.

First Embodiment

Figure 1:
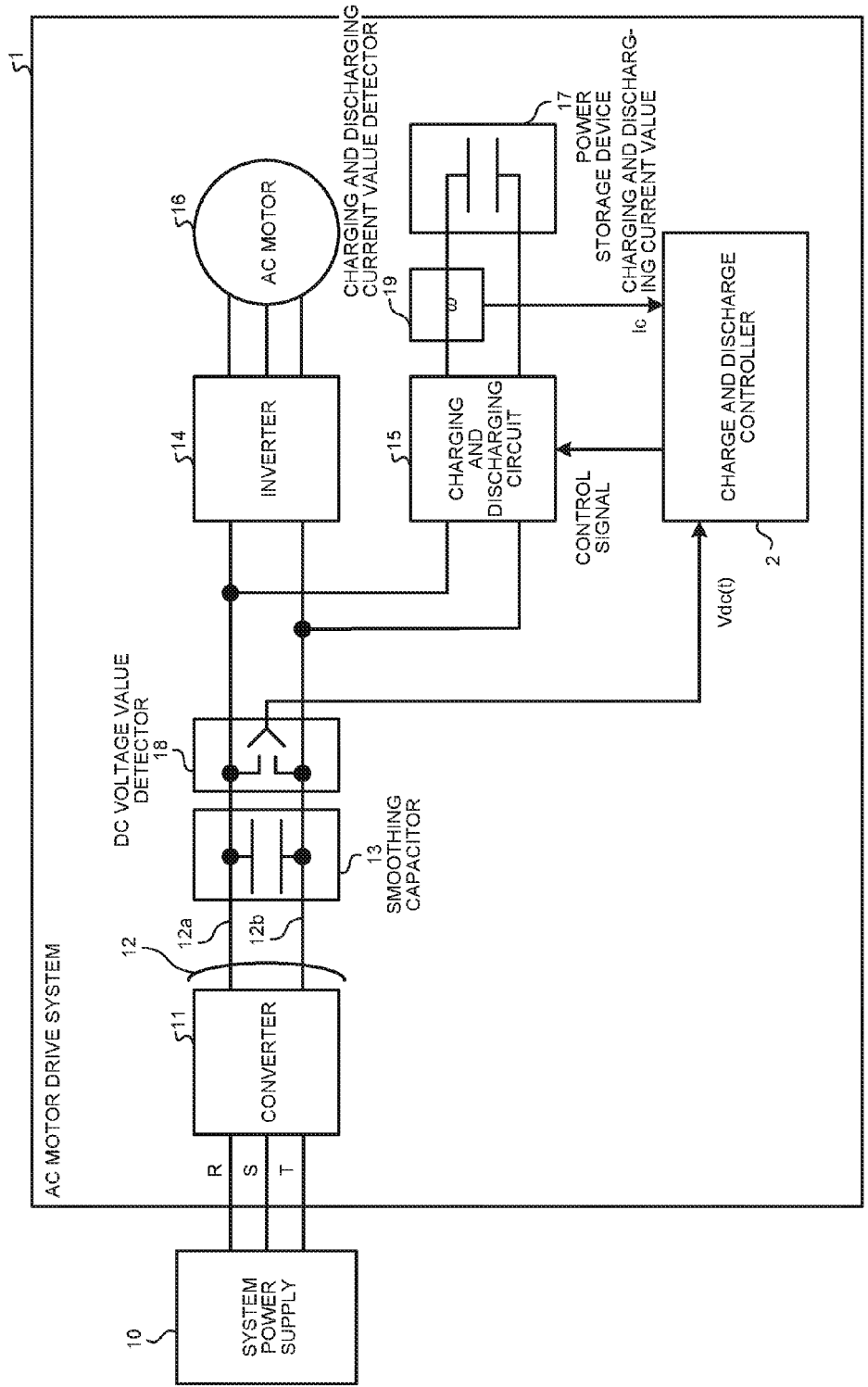
FIG. 1 is a block diagram illustrating the entire configuration of an AC motor drive system according to a first embodiment.

FIG. 1 is a block diagram illustrating the entire configuration of a first embodiment of an AC motor drive system according to the present invention. An AC motor drive system 1 illustrated in FIG. 1 includes a charge and discharge controller 2, a converter 11, a DC bus 12, a smoothing capacitor 13, an inverter 14, a charging and discharging circuit 15, an AC motor 16, a power storage device 17, a DC voltage value detector 18, and a charging and discharging current value detector 19. To the AC motor drive system 1 illustrated in FIG. 1, AC power is supplied from a system power supply 10 in substation equipment or the like in a power plant or a factory via wiring A, S, and T. The converter 11 converts AC power from the system power supply 10 into DC power. The converted DC power is output from the converter 11 to the DC bus 12. The DC bus 12 includes a high-potential-side DC bus 12a and a low-potential-side DC bus 12b. The smoothing capacitor 13 is disposed in the DC bus 12 at the output portion of the converter 11, at any one place or a plurality of places at the input portion of the inverter 14 described below, on the DC bus 12 side of the charging and discharging circuit 15 described below. The smoothing capacitor 13 smoothes DC power between the high-potential-side DC bus 12a and the low-potential-side DC bus 12b. Here, the capacitance of the smoothing capacitor 13 is represented by C[F]. The DC power smoothed by the smoothing capacitor 13 is output to the inverter 14 and the charging and discharging circuit 15 via the DC bus 12. The inverter 14 and the charging and discharging circuit 15 are connected to the DC bus 12 in parallel with each other. The inverter 14 converts DC power into AC power to drive the AC motor 16. The voltage value and frequency of the AC power output by the inverter 14 are different from the voltage value and frequency of the AC power supplied from the system power supply 10. The charging and discharging circuit 15 is a circuit that stores DC power flowing through the DC bus 12 in the power storage device 17 (charge), and releases power stored in the power storage device 17 to the DC bus 12 (discharge). The charging and discharging circuit 15 can be exemplified by a current reversible chopper circuit. When the charging and discharging circuit 15 is a current reversible chopper circuit, power flowing through the DC bus 12 is stored by charging the power storage device 17 with current, and conversely, power stored in the power storage device 17 is released by discharging to the DC bus 12. In the following description, when current flowing to and from the power storage device 17 is expressed without distinction between charging current and discharging current, it is described as charging and discharging current. In the charging and discharging circuit 15, the current reversible chopper circuit is controlled by a control signal from the charge and discharge controller 2 to control the amount of charging and discharging current. The charge and discharge controller 2 is fed, as observed values, with a DC bus voltage value Vdc(t) of the DC bus 12 detected by the DC voltage value detector 18 and a charging and discharging current value Ic detected by the charging and discharging current value detector 19, and outputs a control signal to the charging and discharging circuit 15. The converter 11 can be exemplified by a resistance regeneration type converter in which a resistance regeneration circuit is added to a three-phase full-wave rectification circuit or by a power supply regeneration type converter in which switching devices are respectively connected to diodes constituting a three-phase full-wave rectification circuit in antiparallel to each other, and an AC reactor is interposed in series on the input side. The present embodiment is described by illustrating a power supply regeneration type converter, but the present invention is not limited to this. When the power supply regeneration type converter supplies power from the system power supply 10 to the DC bus 12, by the functions of diodes of a three-phase full-wave rectification circuit in the converter 11 and the smoothing capacitor 13, DC power, which thou h has six times as many ripples as the frequency of the system power supply 10, is supplied to the DC bus 12. In this specification, a time when power is supplied from the system power supply 10 to the DC bus 12 via the converter 11 is referred to as the powering time of the converter 11.

Next, a time when power is regenerated from the DC bus 12 for the system power supply 10 in the power supply regeneration type converter will be described. In this specification, this case is referred to as the regeneration time of the converter 11. In the power supply regeneration type converter, two types of predetermined thresholds are set for the DC bus voltage value Vdc(t) of the DC bus 12 detected by the DC voltage value detector 18. One of the thresholds is referred to as the regeneration start voltage threshold, and the other threshold is referred to as the regeneration end voltage threshold. The regeneration start voltage threshold has a larger value than the regeneration end voltage threshold. The power supply regeneration type converter sets the time between the instant at which the DC bus voltage value Vdc(t) becomes the regeneration start voltage threshold or higher and the instant at which the DC bus voltage value Vdc(t) becomes the regeneration end voltage threshold or lower as a "regeneration possible period" of power from the DC bus 12 for the system power supply 10. The power supply regeneration type converter brings switching devices in the power supply regeneration type converter into a conducting state only for a period in a phase state predetermined according to the phase of the waveform of the system power supply 10 during the regeneration possible period, and regenerates power from the DC bus 12 for the system power supply 10 via an AC reactor in the power supply regeneration type converter, on the basis of the difference between the DC bus voltage value Vdc(t) and the voltage value of the system power supply 10.

Regeneration-time operation of the power supply regeneration type converter has a continuous regeneration mode to regenerate power from the DC bus 12 for the system power supply 10 continuously without temporal intervals, and an intermittent regeneration mode to regenerate power from the DC bus 12 for the system power supply 10 temporally intermittently. When power regenerated from the DC bus 12 for the system power supply 10 is large, the operation is in the continuous regeneration mode. When power regenerated from the DC bus 12 for the system power supply 10 is small, the operation is in the intermittent regeneration mode.

Figure 2:
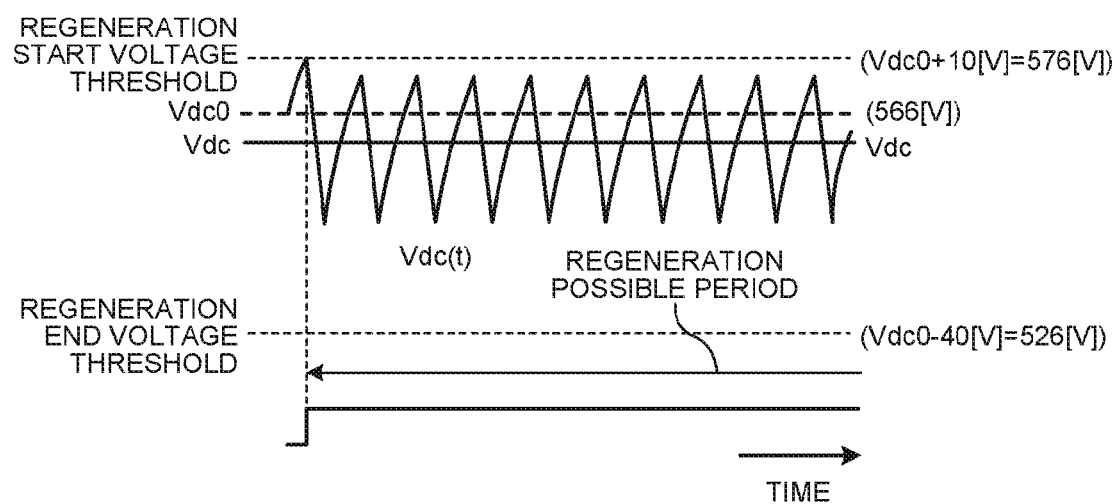
FIG. 2 is a schematic diagram illustrating variations of a DC bus voltage value Vdc(t) during an operation in a continuous regeneration mode when a converter is a power supply regeneration type converter according to the first embodiment.

FIG. 2 is a schematic diagram illustrating variations of the DC bus voltage value Vdc(t) during the operation in the continuous regeneration mode when the power supply regeneration type converter is used. The smoothing capacitor 13 is charged with the regenerative power from the AC motor 16 via the inverter 14, and the DC bus voltage value Vdc(t) rises. When the DC bus voltage value Vdc(t) reaches the regeneration start voltage threshold or higher, the converter 11 starts the regeneration operation. When the converter 11 performs the regeneration operation, power stored in the smoothing capacitor 13 is released to the system power supply 10; therefore, the DC bus voltage value Vdc(t) drops. When the regenerative power of the converter 11 that depends on the difference between the DC bus voltage value Vdc(t) and the system power supply 10 becomes equal to the regenerative power from the AC motor 16, the DC bus voltage value Vdc(t) stops dropping. The DC bus voltage value Vdc(t) that has stopped dropping does not become the regeneration end voltage threshold or lower, and the converter 11 maintains the regeneration possible period. For the end of the continuous regeneration mode, due to the regenerative power from the AC motor 16 becoming smaller, it ends through the operation in the intermittent regeneration mode described below. In the continuous regeneration mode, the regenerative power capacity of the converter 11 depends on the voltage value of the system power supply 10; therefore, the DC bus voltage value Vdc(t) has six times as many ripples as the frequency of the system power supply 10. With the DC bus voltage value when the ripples are averaged as an averaged DC bus voltage value Vdc, from the previous explanation, the larger the regenerative power of the converter 11, the higher potential the averaged DC bus voltage value Vdc has, and conversely, the smaller the regenerative power of the converter 11 in a range of the continuous regeneration mode, the lower potential the averaged DC bus voltage value Vdc shifts to.

FIG. 3 is a schematic diagram illustrating variations of the DC bus voltage value Vdc(t) during the operation in the intermittent regeneration mode when the power supply regeneration type converter is used. First, the smoothing capacitor 13 is charged with the regenerative power from the AC motor 16 via the inverter 14, and the DC bus voltage value Vdc(t) rises. When the DC bus voltage value Vdc(t) reaches the regeneration start voltage threshold or higher, the converter 11 starts the regeneration operation. When the converter 11 performs the regeneration operation, power stored in the smoothing capacitor 13 is released to the system power supply 10; therefore, the DC bus voltage value Vdc(t) drops. Because the regenerative power from the AC motor 16 in the intermittent regeneration mode is smaller than that in the continuous regeneration mode, the DC bus voltage value Vdc(t) drops to the regeneration end voltage threshold or lower. When the DC bus voltage value Vdc(t) reaches the regeneration end voltage threshold or lower, the converter 11 temporarily ends the regeneration operation. When the regenerative power from the AC motor 16 is continuously supplied to the smoothing capacitor 13 via the inverter 14, the DC bus voltage value Vdc(t) rises. When the DC bus voltage value Vdc(t) reaches the regeneration start voltage threshold or higher again, the converter 11 starts the regeneration operation again. In the intermittent regeneration mode, such an operation is repeated. The DC bus voltage value Vdc(t) is a waveform moving between the regeneration start voltage threshold and the regeneration end voltage threshold. At the end of the intermittent regeneration mode, the regenerative power from the AC motor 16 decreases, and finally the regenerative power becomes zero, and the DC bus voltage value Vdc(t) stops rising without reaching the regeneration start voltage threshold. At the point in time when the DC bus voltage value Vdc(t) stops rising, the converter 11 is not in a state the regeneration possible period.

When power regenerated by the converter 11 is relatively large in the intermittent regeneration mode, as illustrated in FIG. 3(*a*), the rise of the DC bus voltage value Vdc(t) during a period when the converter 11 does not perform the regeneration operation is rapid, and the converter 11 returns early to a regeneration possible period.

Conversely, when power regenerated by the converter 11 is relatively small, as illustrated in FIG. 3(*b*), the rise of the DC bus voltage value Vdc(t) during a period when the converter 11 does not perform the regeneration operation is slow, and it takes time for the converter 11 to return to a regeneration possible period. In the intermittent regeneration mode, the DC bus voltage value when the DC bus voltage value Vdc(t) moving between the regeneration start voltage threshold and the regeneration end voltage threshold is averaged is the averaged DC bus voltage value Vdc. From the previous explanation, also in the intermittent regeneration mode, the larger the regenerative power of the converter 11, the higher potential the averaged DC bus voltage value Vdc has, and conversely, the smaller the regenerative power of the converter 11, the lower potential the averaged DC bus voltage value Vdc shifts to.

Figure 4:
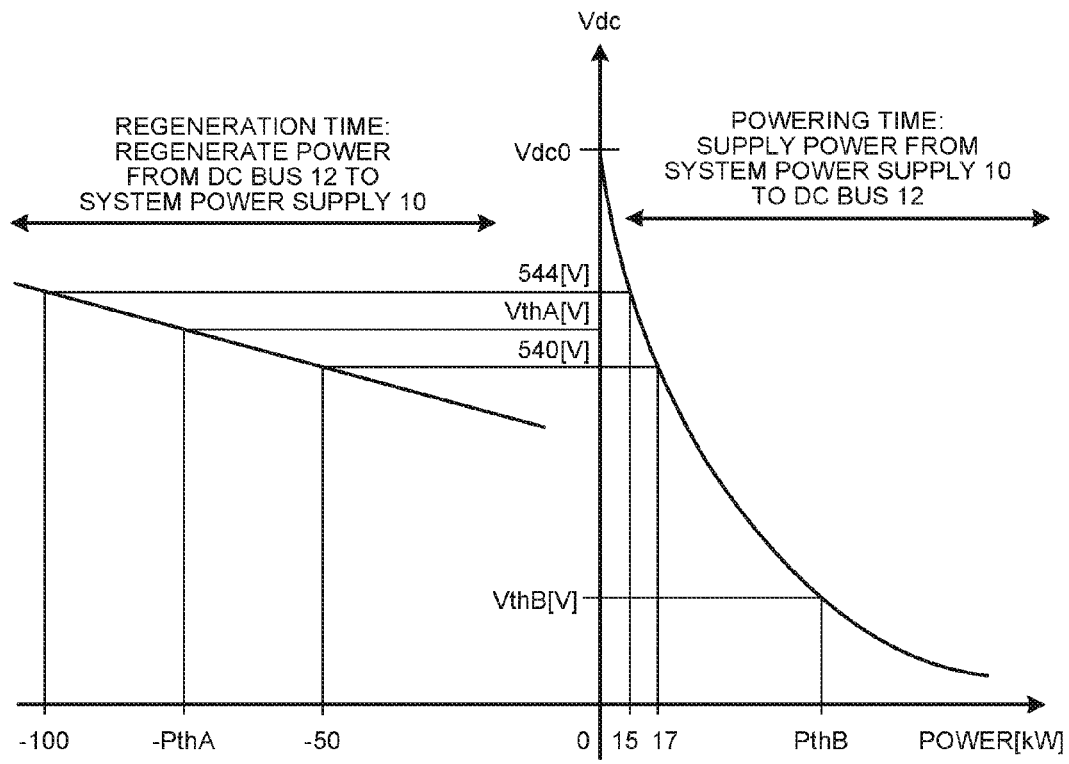
FIG. 4 is a schematic diagram illustrating the relationship between power passing through the converter and an averaged DC bus voltage value Vdc according to the first embodiment.

Here, the DC bus voltage value Vdc(t) when no power is exchanged between the system power supply 10 and the DC bus 12 is expressed as a no-load-time DC bus voltage value Vdc0. When the phase voltage of the system power supply 10 is 400 [V], the no-load-time DC bus voltage value Vdc0 is about 566 [V]. When the regeneration start voltage threshold is set at a voltage value raised from the no-load-time DC bus voltage value Vdc0 [V] by a small value (e.g. 10 [V]), and conversely, when the regeneration end voltage threshold is set at a voltage value dropped from the no-load-time DC bus voltage value Vdc0 [V] by a large value (e.g. 40 [V]), as illustrated in FIGS. 2 and 3, the averaged DC bus voltage value Vdc of the converter 11 is dropped below the no-load-time DC bus voltage value Vdc0. FIG. 4 is a schematic diagram illustrating the relationship between power passing through the converter and the averaged DC bus voltage value Vdc, and illustrates an example of the relationship between the powering-time power of the converter 11 and the averaged DC bus voltage value Vdc and the relationship between the regeneration-time power of the converter 11 and the averaged DC bus voltage value Vdc when the regeneration start voltage threshold is Vdc0+10 [V] and the regeneration end voltage threshold is Vdc0−40 [V]. In this specification and FIG. 4, the powering time and the regeneration time of the converter 11 are clarified by setting the powering-time power of the converter 11 at a positive value and setting the regeneration-time power of the converter 11 at a negative value. Charging current to the power storage device 17 is set at a positive value, and discharging current from the power storage device 17 is set at a negative value.

The averaged DC bus voltage value Vdc at the powering time of the converter 11 is an averaged value of ripples of the DC bus voltage value Vdc(t) when power is supplied from the system power supply 10 to the DC bus 12 via the converter 11. As illustrated in FIG. 4, in the converter 11 in which the regeneration start voltage threshold is set at a voltage value raised from the no-load-time DC bus voltage value Vdc0 by a small value, and conversely, the regeneration end voltage threshold is set at a voltage value dropped from the no-load-time DC bus voltage value Vdc0 by a large value, the averaged DC bus voltage value Vdc is dropped below Vdc0 at both the powering time and the regeneration time. Further, in FIG. 4, for example, the averaged DC bus voltage value Vdc is 540 [V] in a situation where the converter 11 performs powering from the system power supply 10 to the DC bus 12 by 17 [kW], and in a situation where the converter 11 performs regeneration from the DC bus 12 to the system power supply 10 by −50 [kw]. Likewise, the averaged DC bus voltage value Vdc is 544 [V] in a situation where the converter 11 performs powering from the system power supply 10 to the DC bus 12 by 15 [kW], and in a situation where the converter 11 performs regeneration from the DC bus 12 to the system power supply 10 by −100 [kW].

Figure 5:
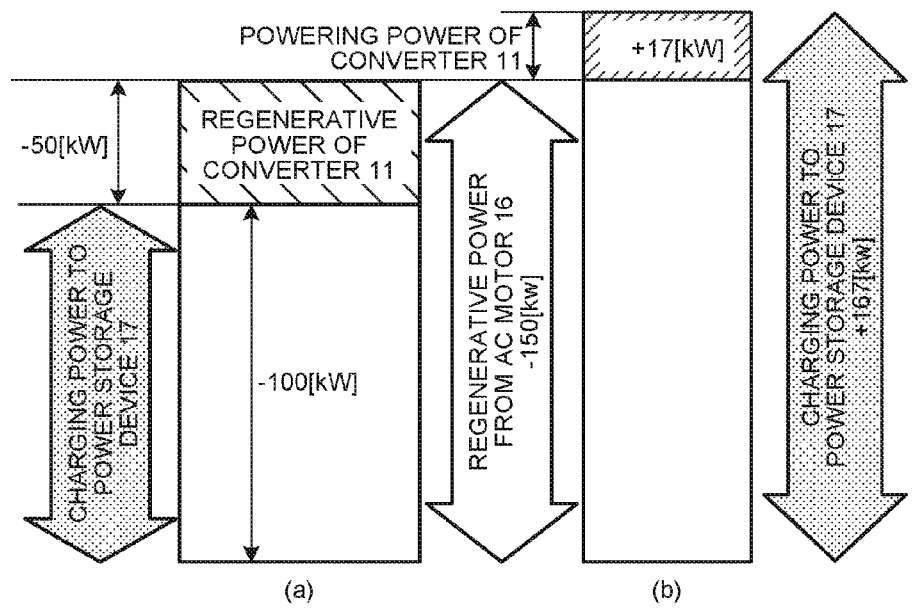
FIG. 5 is a power distribution diagram illustrating that the converter can assume both states of a powering operation state and a regeneration operation state when controlled to the same DC bus voltage value according to the first embodiment.

FIG. 5 is a power distribution diagram illustrating that the converter can assume both states of a powering operation state and a regeneration operation state when controlled to the same DC bus voltage value, and is a diagram illustrating transfers of power between the converter 11, the AC motor 16, and the power storage device 17 at the powering time and the regeneration time of the converter 11 when the AC motor drive system 1 is controlled to the same averaged DC bus voltage value Vdc [V], under the same conditions of the regenerative power from the AC motor 16. FIG. 5(*a*) is a diagram illustrating a situation where the converter 11 is at the regeneration time when controlled to Vdc=540 [V], and the regenerative power from the AC motor 16 is −150 [kW]. FIG. 5(*b*) is a diagram illustrating a situation where the converter 11 is at the powering time when controlled to Vdc=540 [V], and the regenerative power from the AC motor 16 is −150 [kW]. Suppose that the averaged DC bus voltage value Vdc at the regeneration time of the converter 11 and the averaged DC bus voltage value Vdc at the powering time of the converter 11 comply with those in FIG. 4, individually.

In FIG. 5(*a*), the entire rectangle corresponds to regenerative power of −150 [kW] from the AC motor 16, a plain rectangular portion of −100 [kW] represents power with which the power storage device 17 is charged, and a hatched rectangular portion of −50 [kW] represents power regenerated from the DC bus 12 for the system power supply 10 via the converter 11. Conversely, in FIG. 5(*b*), a plain rectangular portion corresponds to regenerative power of −150 [kW] from the AC motor 16, a hatched rectangular portion of +17 [kW] represents power supplied from the system power supply 10 to the DC bus 12 via the converter 11, and the sum of both the power, i.e., 167 [kW], is power with which the power storage device 17 is charged.

In the case of FIG. 5(*a*), the value of charging current flowing from the DC bus 12 to the charging and discharging circuit 15 is about 185 [A] as given by the following expression (1).

$$|-100\ [\text{kW}]|/540\ [\text{V}] \approx 185\ [\text{A}] \quad (1)$$

On the other hand, in the case of FIG. 5(*b*), the value of charging current flowing from the DC bus 12 to the charging and discharging circuit 15 is larger, about 309 [A], as given by the following expression (2).

$$|-167\ [\text{kW}]|/540\ [\text{V}] \approx 309\ [\text{A}] \quad (2)$$

When the power storage device 17 is charged with all the regenerative power from the AC motor 16, that is, when the converter 11 performs neither the powering operation nor the regeneration operation, the charging current value is about 278 [A] as given by the following expression (3). Z included in Expressions (1) to (3) is an absolute value of Z.

$$|-150 \text{ [kW]}|/540 \text{ [V]} \approx 278 \text{ [A]} \qquad (3)$$

In the present embodiment, from FIGS. 4 and 5(a), the voltage command value of the DC bus 12 when the converter 11 suppresses the regenerative power from the DC bus 12 for the system power supply 10 to −50 [kW] is 540 [V]. Likewise, from FIG. 4, the voltage command value of the DC bus 12 when the converter 11 suppresses the regenerative power from the DC bus 12 for the system power supply 10 to −100 [kW] is 544 [V]. Hereinafter, the regeneration-time DC bus voltage command value when the converter 11 suppresses the regenerative power from the DC bus 12 for the system power supply 10 to a regeneration-time power threshold −PthA [kW] is denoted as VthA [V].

The amount of current flowing through the DC bus 12 can be a large value as given by Expressions (1) to (3) above. The waveform of current flowing through the DC bus 12 contains a large high-frequency component due to the presence of ripples at the powering time of the converter 11, the presence of ripples in the continuous regeneration mode of the converter 11, the presence of repetition of rises and drops of the DC bus voltage value Vdc(t) in the intermittent regeneration mode of the converter 11, or the presence of noise caused by switching of switching devices in the converter 11 or switching devices in the inverter 14. Therefore, to detect the DC bus current value, a unit for detecting the DC bus current value used cannot avoid becoming expensive, large in volume, and large in mass due to the equipment for countermeasures to avoid magnetic saturation caused by the large current and against heat generation (heat radiation) by harmonic components of the current waveform.

Embodiments in the present invention have a common object of providing the charge and discharge controller 2 and a method of controlling the charge and discharge controller 2 to prevent the converter 11 from transitioning to the powering operation even though the charging and discharging circuit 15 is charging the power storage device 17, only using the DC voltage value detector 18 on the DC bus 12 without using a unit for detecting the DC bus current value. The present invention, which does not use a unit for detecting the DC bus current value, can thus provide an inexpensive, compact, and lightweight AC motor drive system 1 that prevents the converter 11 from transitioning to the powering operation even though the charging and discharging circuit 15 is charging the power storage device 17.

Figure 6:
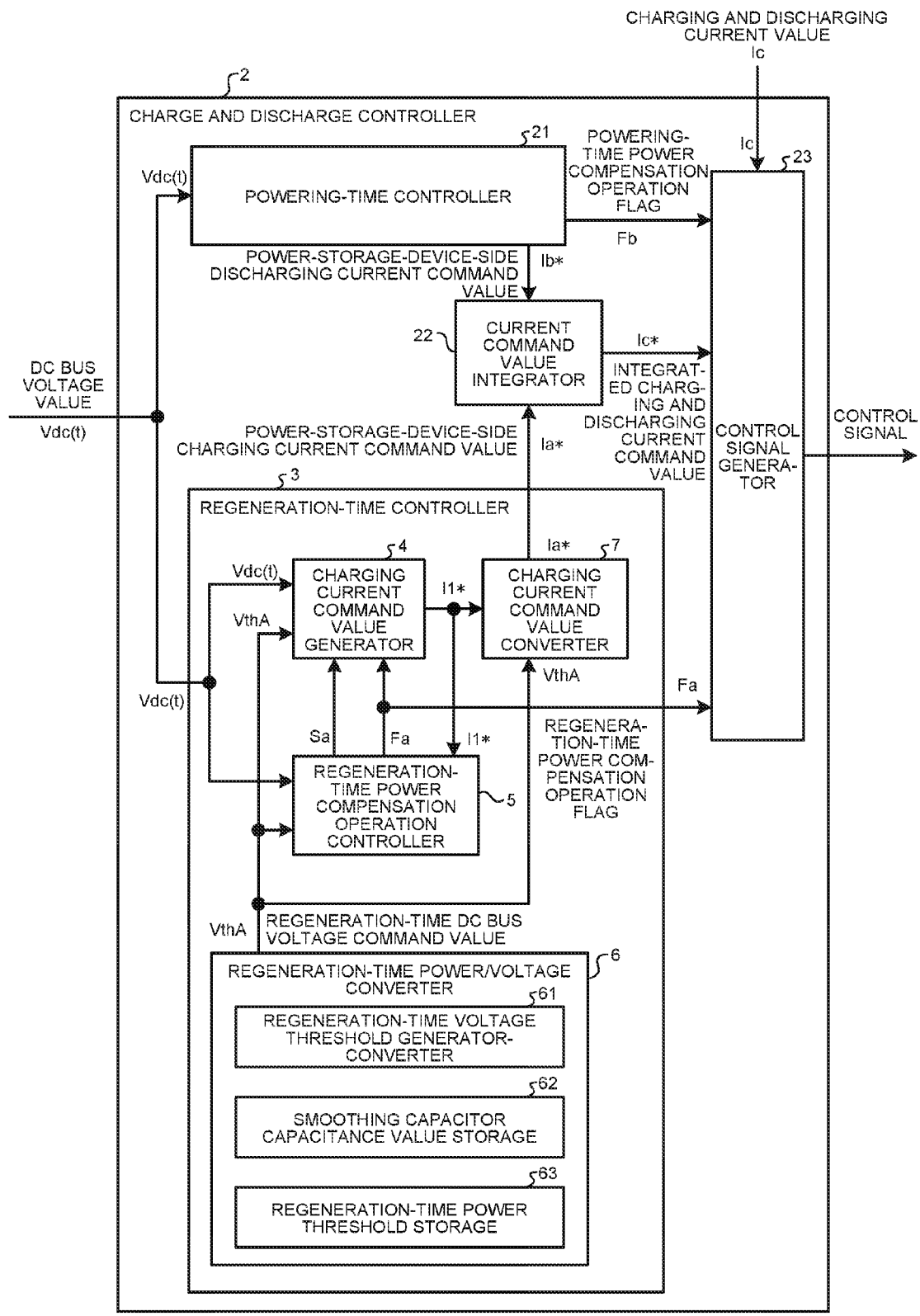
FIG. 6 is a block diagram illustrating a charge and discharge controller in the AC motor drive system according to the first embodiment.

FIG. 6 is a block diagram illustrating the charge and discharge controller 2 in the AC motor drive system 1. The charge and discharge controller 2 illustrated in FIG. 6 includes a powering-time controller 21, the regeneration-time controller 3, a current command value integrator 22, and a control signal generator 23. The powering-time controller 21 receives input of the DC bus voltage value Vdc(t) of the DC bus 12 detected by the DC voltage value detector 18. The powering-time controller 21 outputs a power-storage-device-side discharging current command value Ib*, which is a command value to control discharging current to be discharged from the power storage device 17, and a powering-time power compensation operation flag Fb to determine a period to discharge the power storage device 17. The powering-time controller 21, using the characteristics illustrated on the right half in FIG. 4 (powering time), first generates a DC bus-side discharging current command value for discharge from the charging and discharging circuit 15 to the inverter 14 so as to reduce and finally eliminate the difference between a voltage value VthB [V] corresponding to the power PthB [kW] to which the converter 11 is suppressing power supplied from the system power supply 10 to the DC bus 12 during the powering time of the converter 11, as a powering-time DC bus voltage command value, and the DC bus voltage value Vdc(t). Then, the powering-time controller 21 generates the power-storage-device-side discharging current command value Ib* by converting the DC bus-side discharging current command value on the basis of the ratio between the DC bus voltage value Vdc(t) and the voltage value across the power storage device 17 or, in place of the voltage value across the power storage device 17, a typical pseudo both-end voltage value. The powering-time controller 21 generates the powering-time power compensation operation flag Fb that is valid for a period during which the power-storage-device-side discharging current command value Ib* commands discharge, on the basis of the powering-time DC bus voltage command value VthB and the DC bus voltage value Vdc(t).

The regeneration-time controller 3 receives input of the DC bus voltage value Vdc(t) of the DC bus 12 detected by the DC voltage value detector 18. The regeneration-time controller 3 outputs a power-storage-device-side charging current command value Ia*, which is a command value to control the charging current to charge the power storage device 17, and a regeneration-time power compensation operation flag Fa to determine a period to charge the power storage device 17. Details of the regeneration-time controller 3 will be described below.

The current command value integrator 22 generates an integrated charging and discharging current command value Ic*, which is a command value of charging and discharging current of the power storage device 17, using the power-storage-device-side charging current command value Ia* from the regeneration-time controller 3 and the power-storage-device-side discharging current command value Ib* from the powering-time controller 21. On the basis of the integrated charging and discharging current command value Ic* from the current command value integrator 22 and the charging and discharging current value Ic of the power storage device 17 from the charging and discharging current value detector 19, the control signal generator 23 outputs a control signal to control the charging and discharging circuit 15 to the charging and discharging circuit 15 only for a period during which the regeneration-time power compensation operation flag Fa from the regeneration-time controller 3 is valid or for a period during which the powering-time power compensation operation flag Fb from the powering-time controller 21 is valid, in order to reduce the difference between the integrated charging and discharging current command value Ic* and the charging and discharging current value Ic and to finally eliminate the difference.

From here, an explanation will be given of a control unit and a control method for preventing the converter 11 from transitioning to the powering operation while the charging and discharging circuit 15 is charging the power storage device 17 by the regeneration-time controller 3 in the charge and discharge controller 2 in the present embodiment, using only the DC bus voltage value Vdc(t), which is the output of the DC voltage value detector 18, for the DC bus 12, without using a unit for detecting the DC bus current value.

As illustrated in FIG. 6, the regeneration-time controller 3 includes a charging current command value generator 4, a regeneration-time power compensation operation controller 5, a regeneration-time power/voltage converter 6, and a charging current command value converter 7. The DC bus voltage value Vdc(t), which is input from the DC voltage value detector 18 to the regeneration-time controller 3, is input to the charging current command value generator 4 and the regeneration-time power compensation operation controller 5. The power-storage-device-side charging current command value Ia*, which is one of the outputs of the regeneration-time controller 3, is output from the charging current command value converter 7 to the current command value integrator 22. The regeneration-time power compensation operation flag Fa, which is another output of the regeneration-time controller 3, is output from the regeneration-time power compensation operation controller 5 to the control signal generator 23. The regeneration-time power compensation operation flag Fa is also output to the charging current command value generator 4.

The regeneration-time power/voltage converter 6 includes a regeneration-time voltage threshold generator-converter 61, a smoothing capacitor capacitance value storage 62, and a regeneration-time power threshold storage 63. The regeneration-time power threshold storage 63 stores the regeneration-time power threshold −PthA [kW], which is the upper limit of power that the converter 11 is caused to regenerate. The smoothing capacitor capacitance value storage 62 stores the capacitance value C[F] of the smoothing capacitor 13. The regeneration-time voltage threshold generator-converter 61 generates the regeneration-time DC bus voltage command value VthA [V] at the regeneration time, using the relationships stated on the left half in FIG. 4 (regeneration time), on the basis of the regeneration-time power threshold −PthA [kW] from the regeneration-time power threshold storage 63, and the capacitance value C[F] from the smoothing capacitor capacitance value storage 62. The regeneration-time DC bus voltage command value VthA [V] generated by the regeneration-time voltage threshold generator-converter 61 is output as an output of the regeneration-time power/voltage converter 6 to the charging current command value generator 4, the regeneration-time power compensation operation controller 5, and the charging current command value converter 7. The regeneration-time power threshold −PthA [V] at the regeneration time and the capacitance value C[F] may be set as appropriate according to the work load of the AC motor drive system 1 and the configuration of the inverter 14. It is only necessary to provide a configuration to allow a user to enter the respective values in the regeneration-time power threshold storage 63 and the smoothing capacitor capacitance value storage 62.

The regeneration-time power compensation operation controller 5 generates a regeneration-time power compensation operation start signal Sa indicating the timing to start to charge the power storage device 17, on the basis of the DC bus voltage value Vdc(t) from the DC voltage value detector 18. The regeneration-time power compensation operation controller 5 generates the regeneration-time power compensation operation flag Fa indicating a period to charge the power storage device 17, using the DC bus voltage value Vdc(t), the regeneration-time DC bus voltage command value VthA from the regeneration-time power/voltage converter 6, and the DC bus-side charging current command value I1* from the charging current command value generator 4. The regeneration-time power compensation operation start signal Sa generated by the regeneration-time power compensation operation controller 5 is output to the charging current command value generator 4. The regeneration-time power compensation operation flag Fa is output to the charging current command value generator 4 and the control signal generator 23. The regeneration-time power compensation operation start signal Sa is, for example, a signal indicating a time at which the DC bus voltage value Vdc(t) has reached a regeneration start voltage threshold or a signal indicating a time at which it has become the no-load-time DC bus voltage value Vdc0 [V] or higher. The regeneration-time power compensation operation flag Fa is, for example, a signal indicating a period from a time indicated by the regeneration-time power compensation operation start signal Sa to a time at which the DC bus-side charging current command value I1* becomes zero or a negative value, or becomes a positive value of a value sufficiently close to zero. Here, as a value sufficiently close to zero, for example, a predetermined value less than one hundredth of a maximum value that the DC bus-side charging current command value I1* can take is used. In relation to a condition for the regeneration-time power compensation operation start signal Sa to be valid, and a start condition for the regeneration-time power compensation operation flag Fa to be valid and an end condition, chattering prevention, setting of a dead band, or the like may be performed to eliminate the effects of fluctuations of noise superimposed on the DC bus voltage value Vdc(t) and the DC bus-side charging current command value I1*.

The charging current command value converter 7 converts the DC bus-side charging current command value I1*, which is a command value of the charging current from the DC bus 12 to the charging and discharging circuit 15, into the power-storage-device-side charging current command value Ia*, which is a command value of charging current from the charging and discharging circuit 15 to the power storage device 17. The charging current command value converter 7 receives input of the DC bus-side charging current command value I1*, which is the output of the charging current command value generator 4, and the regeneration-time DC bus voltage command value VthA, which is the output of the regeneration-time power/voltage converter 6. The charging current command value converter 7 outputs the power-storage-device-side charging current command value Ia* as its output to the current command value integrator 22. Now, let the voltage across the power storage device 17 be a both-end voltage value Vcap [V], and taking into account that the voltage value of the DC bus 12 is controlled such that it becomes the regeneration-time DC bus voltage command value VthA, the power-storage-device-side charging current command value Ia* can be expressed by Expression (4) below.

$$Ia^* = (VthA/Vcap)I1^* \qquad (4)$$

To obtain Expression (4) above, it is necessary to observe the both-end voltage value Vcap of the power storage device 17 and perform division. In order to eliminate a unit for detecting the both-end voltage value Vcap of the power storage device 17 and omit a division that is a complicated calculation, the both-end voltage value Vcap of the power storage device 17 is substituted by a substitute both-end voltage value Vcfix [V], which is a predetermined constant. The substitute both-end voltage value Vcfix is not particularly limited. For example, a minimum value of the both-end voltage value Vcap of the power storage device 17, a most frequently appearing value of the both-end voltage value Vcap of the power storage device 17, or the like is used. The charging current command value converter 7 stores a constant Kc (Kc=1/Vcfix), which is a reciprocal of the substitute both-end voltage value Vcfix, and converts the DC bus-side charging current command value I1* into the power-storage-device-side charging current command value Ia*, using Expression (5) below.

$$Ia^* = Kc(VthA)(I1^*) \qquad (5)$$

The charging current command value generator 4 receives input of the DC bus voltage value Vdc(t) from the DC voltage value detector 18, the regeneration-time DC bus voltage command value VthA from the regeneration-time power/voltage converter 6, the regeneration-time power compensation operation start signal Sa from the regeneration-time power compensation operation controller 5, and the regeneration-time power compensation operation flag Fa from the regeneration-time power compensation operation controller 5, and generates the DC bus-side charging current command value I1*. The charging current command value generator 4 outputs the generated DC bus-side charging current command value I1* to the regeneration-time power compensation operation controller 5 and the charging current command value converter 7.

Figure 7:
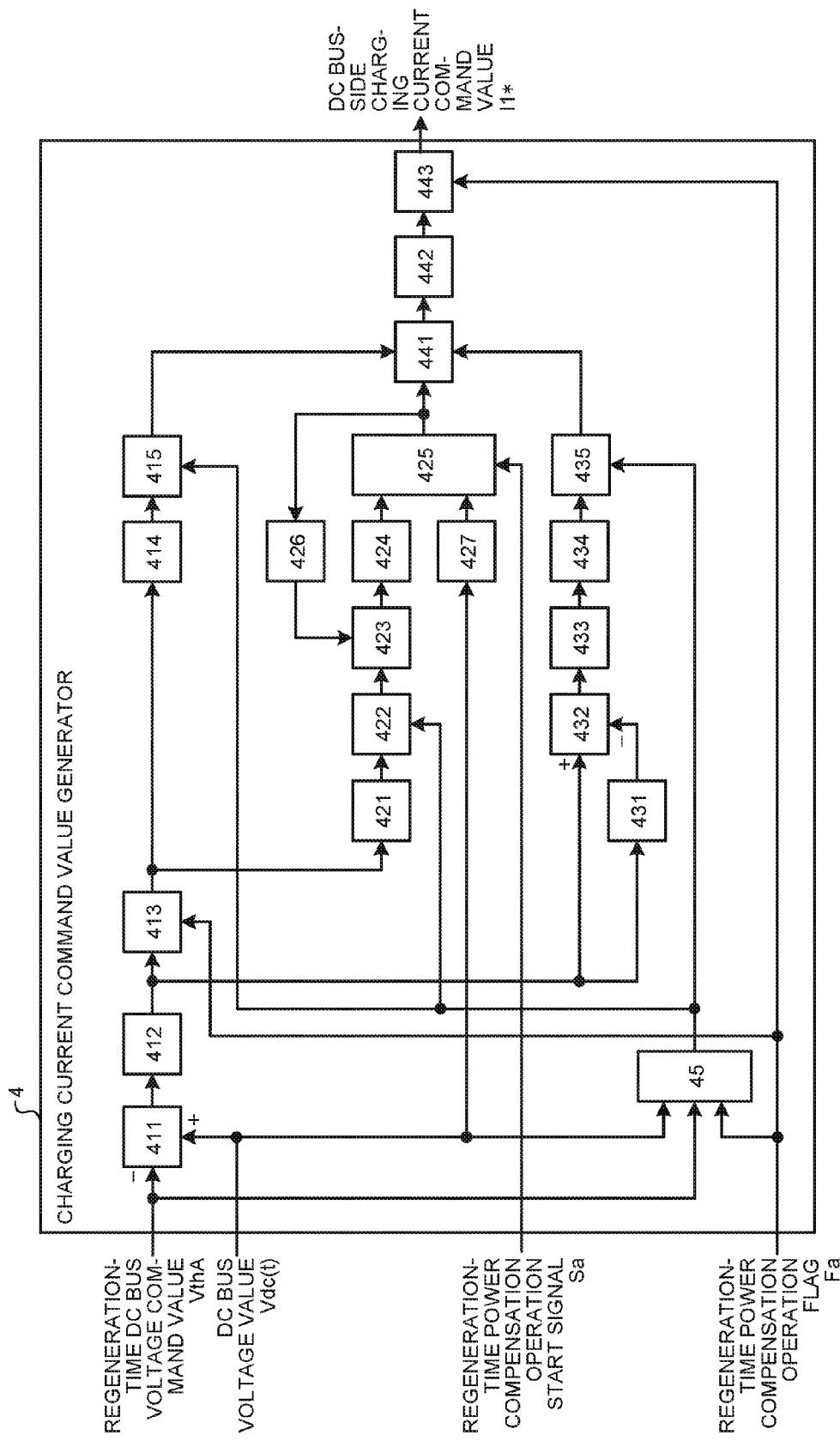
FIG. 7 is a block diagram illustrating a charging current command value generator when PID control is performed according to the first embodiment.

A case where the charging current command value generator 4 performs proportional-plus-integral-plus-derivative control (PID control) will be described as an example. FIG. 7 is a block diagram illustrating the charging current command value generator 4 when the PID control is performed. As illustrated in FIG. 7, the charging current command value generator 4 includes a first subtractor 411, a first multiplier 412, a first switch 413, a first limiter 414, a second switch 415, a second multiplier 421, a third switch 422, a first adder 423, a second limiter 424, a fourth switch 425, a first delay device 426, a regeneration-time current-command-value-integral-component initial value generator 427, a second delay device 431, a second subtractor 432, a third multiplier 433, a third limiter 434, a fifth switch 435, a second adder 441, a fourth limiter 442, a sixth switch 443, and a regeneration-time charging current command value suppressor 45. The DC bus voltage value Vdc(t) is input to a minuend terminal of the first subtractor 411, the regeneration-time current-command-value-integral-component initial value generator 427, and the regeneration-time charging current command value suppressor 45. The regeneration-time DC bus voltage command value VthA is input to a subtrahend terminal of the first subtractor 411 and the regeneration-time charging current command value suppressor 45. The regeneration-time power compensation operation flag Fa is input to the first switch 413, the sixth switch 443, and the regeneration-time charging current command value suppressor 45. The first subtractor 411 generates a regeneration-time voltage difference value Ev, which is a value obtained by subtracting the regeneration-time DC bus voltage command value VthA from the DC bus voltage value Vdc(t), and outputs it to the first multiplier 412. The first multiplier 412 generates a first multiplication value Kp·Ev by multiplying the regeneration-time voltage difference value Ev by a predetermined constant Kp, which is a proportional gain, and outputs it to the first switch 413, the second delay device 431, and a minuend terminal of the second subtractor 432. The first switch 413 receives input of the first multiplication value Kp·Ev and the regeneration-time power compensation operation flag Fa. The first switch 413 outputs the first multiplication value Kp·Ev unchanged as an output value (value Ip) when the regeneration-time power compensation operation flag Fa is valid (period to charge the power storage device 17), and outputs the value Ip of zero when the regeneration-time power compensation operation flag Fa is not valid. The value Ip output by the first switch 413 is output to the first limiter 414 and the second multiplier 421. Here, a limit value of charging current in the AC motor drive system 1 is a charging current limit value Imax (>0) [A]. As the charging current limit value Imax, for example, a maximum value of charging current of the charging and discharging circuit 15, a maximum value of charging current of the power storage device 17 or a predetermined value in the AC motor drive system 1, which is a value close to these maximum values, is used.

The first limiter 414 outputs zero as an output value L·Ip when the input value Ip is a negative value, outputs the value of the charging current limit value Imax as the output value L·Ip when the input value Ip exceeds the charging current limit value Imax, and outputs the input value Ip as the output value L·Ip when the input value Ip is a positive value lower than or equal to the charging current limit value Imax. The output value L·Ip of the first limiter 414 is input to the second switch 415. The second switch 415 receives input of the output value L·Ip of the first limiter 414 and a regeneration-time charging-current-command-value suppression flag S, which is the output of the regeneration-time charging current command value suppressor 45 described below, and outputs a regeneration-time charging-current-command-value proportional component value Ip* to the second adder 441. The second switch 415 outputs the value L·Ip input to the second switch 415 unchanged as the regeneration-time charging-current-command-value proportional component value Ip* when the regeneration-time charging-current-command-value suppression flag S also described below is not valid, and outputs zero as the regeneration-time charging-current-command-value proportional component value Ip* when the regeneration-time charging-current-command-value suppression flag S is valid. The second multiplier 421 generates a second multiplication value Ki·Ip by multiplying the value Ip output by the first switch 413 by the predetermined constant Ki, which is an integration gain, and outputs it to the third switch 422. The third switch 422 receives input of the second multiplication value Ki·Ip and the regeneration-time charging-current-command-value suppression flag S, and outputs a value Ii to one input terminal of the first adder 423. The third switch 422 outputs the second multiplication value Ki·Ip input to the third switch 422 unchanged as the output value (value Ii) when the regeneration-time charging-current-command-value suppression flag S is not valid, and outputs zero as the output value (value Ii) when the regeneration-time charging-current-command-value suppression flag S is valid. The first adder 423 calculates the sum of the value Ii, which is an output value of the third switch 422, and a value Z·Ii output by the first delay device 426 described below, and outputs a first sum ΣIi to the second limiter 424. The second limiter 424 outputs zero as an output value (value L·Ii) when the first sum ΣIi is a negative value, outputs the charging current limit value Imax as the output value (value L·Ii) when the first sum ΣIi exceeds the charging current limit value Imax, and outputs the first sum ΣIi as the output value (value L·Ii) when the first sum ΣIi is a positive value lower than or equal to the charging current limit value Imax. The output value (value L·Ii) of the second limiter 424 is input to the fourth switch 425. In accordance with the regeneration-time power compensation operation start signal Sa, the fourth switch 425 switches between the output value L·Ii of the second limiter 424 and a regeneration-time current-command-value-integral-component initial value Iinit, which is the output of the regeneration-time current-command-value-integral-component initial value generator 427, to output the regeneration-time charging-current-command-value integral component value Ii* as its output. Specifically, when the regeneration-time power compensation operation start signal Sa is valid (regeneration operation start time), it outputs the regeneration-time current-command-value-integral-component initial value Iinit as the regeneration-time charging-current-command-value integral component value Ii*, and when the regeneration-time power compensation operation start signal Sa is not valid, it outputs the value L·Ii as the regeneration-time charging-current-command-value integral component value Ii*. The regeneration-time charging-current-command-value integral component value Ii* is input to the first delay device 426 and the second adder 441. The first delay device 426 delays the input regeneration-time charging-current-command-value integral component value Ii* by a unit control time interval, and outputs it as a first delay value Z·Ii to an input terminal different from the input terminal of the value Ii of the first adder 423. The regeneration-time current-command-value-integral-component initial value generator 427 calculates the voltage value displacement (time displacement) of the input DC bus voltage value Vdc(t) in a predetermined time interval, and outputs a charging current command value estimated from the time displacement as the regeneration-time current-command-value-integral-component initial value Iinit to the fourth switch 425. The regeneration-time current-command-value-integral-component initial value Iinit is selected by the fourth switch 425 for a period during which the regeneration-time power compensation operation start signal Sa is valid, and is output as the regeneration-time charging-current-command-value integral component value Ii* Thus, the regeneration-time current-command-value-integral-component initial value Iinit is an initial value of the regeneration-time charging-current-command-value integral component value Ii*. When the regeneration-time charging-current-command-value suppression flag S is not valid, the first adder 423, the second limiter 424, the fourth switch 425, the first delay device 426, and the regeneration-time current-command-value-integral-component initial value generator 427 sequentially integrate the second multiplication value Ki·Ip with an initial value as the regeneration-time current-command-value-integral-component initial value Iinit. The second delay device 431 delays the input first multiplication value Kp·Ev by a unit control time interval, and outputs it as a second delay value Z·Kp·Ev to a subtrahend terminal of the second subtractor 432. The second subtractor 432 outputs a value obtained by subtracting the second delay value Z·Kp·Ev from the first multiplication value Kp·Ev as a difference Id to the third multiplier 433. The third multiplier 433 generates a third multiplication value Kd·Id by multiplying the difference Id by a predetermined constant Kd, which is a differential gain of the difference Id, and outputs it to the third limiter 434. The third limiter 434 outputs zero as a value L·Id when the third multiplication value Kd·Id is a negative value, outputs the charging current limit value Imax as the value L·Id when the third multiplication value Kd·Id is a value exceeding the charging current limit value Imax, and outputs the third multiplication value Kd·Id as the value L·Id when the third multiplication value Kd·Id is a positive value lower than or equal to the charging current limit value Imax. The value L·Id output by the third limiter 434 is input to the fifth switch 435. The fifth switch 435 receives input of the value L·Id output by the third limiter 434 and the regeneration-time charging-current-command-value suppression flag S, which is the output of the regeneration-time charging current command value suppressor 45 described below, and outputs a regeneration-time charging-current-command-value differential component value Id* to the second adder 441. The fifth switch 435 outputs the value L·Id input to the fifth switch 435 unchanged as the regeneration-time charging-current-command-value differential component value Id* when the regeneration-time charging-current-command-value suppression flag S is not valid, and outputs zero as the regeneration-time charging-current-command-value differential component value Id* when the regeneration-time charging-current-command-value suppression flag S is valid. The second adder 441 outputs the sum of the regeneration-time charging-current-command-value proportional component value Ip*, the regeneration-time charging-current-command-value integral component value Ii*, and the regeneration-time charging-current-command-value differential component value Id* as a second sum Ipid to the fourth limiter 442. The fourth limiter 442 outputs zero as an output value L·I1 when the second sum Ipid is a negative value, outputs the charging current limit value Imax as the output value L·I1 when the second sum Ipid exceeds the charging current limit value Imax, and outputs a value of the second sum Ipid as the output value L·I1 when the second sum Ipid is a positive value lower than or equal to the charging current limit value Imax. The output value L·I1 of the fourth limiter 442 is output to the sixth switch 443. The sixth switch 443 receives input of the value L·I1 output by the fourth limiter 442 and the regeneration-time power compensation operation flag Fa. The sixth switch 443 outputs the input value L·I1 unchanged as the DC bus-side charging current command value I1* when the regeneration-time power compensation operation flag Fa is valid (period to charge the power storage device 17), and outputs zero as the DC bus-side charging current command value I1* when the regeneration-time power compensation operation flag Fa is not valid. The DC bus-side charging current command value I1*, which is the output of the sixth switch 443, is input to the regeneration-time power compensation operation controller 5 and the charging current command value converter 7.

When the regeneration-time DC bus voltage command value VthA [V] is set as the control end point, there are two situations: the regeneration time and the powering time of the converter 11, which has already been described with reference to FIGS. 4 and 5. The converter 11 in the continuous regeneration mode does not transition from the regeneration operation to the powering operation. When the converter 11 at the regeneration time transitions to the powering operation, it is in a period other than the regeneration possible period in the intermittent regeneration mode of the converter 11.

Figure 8:
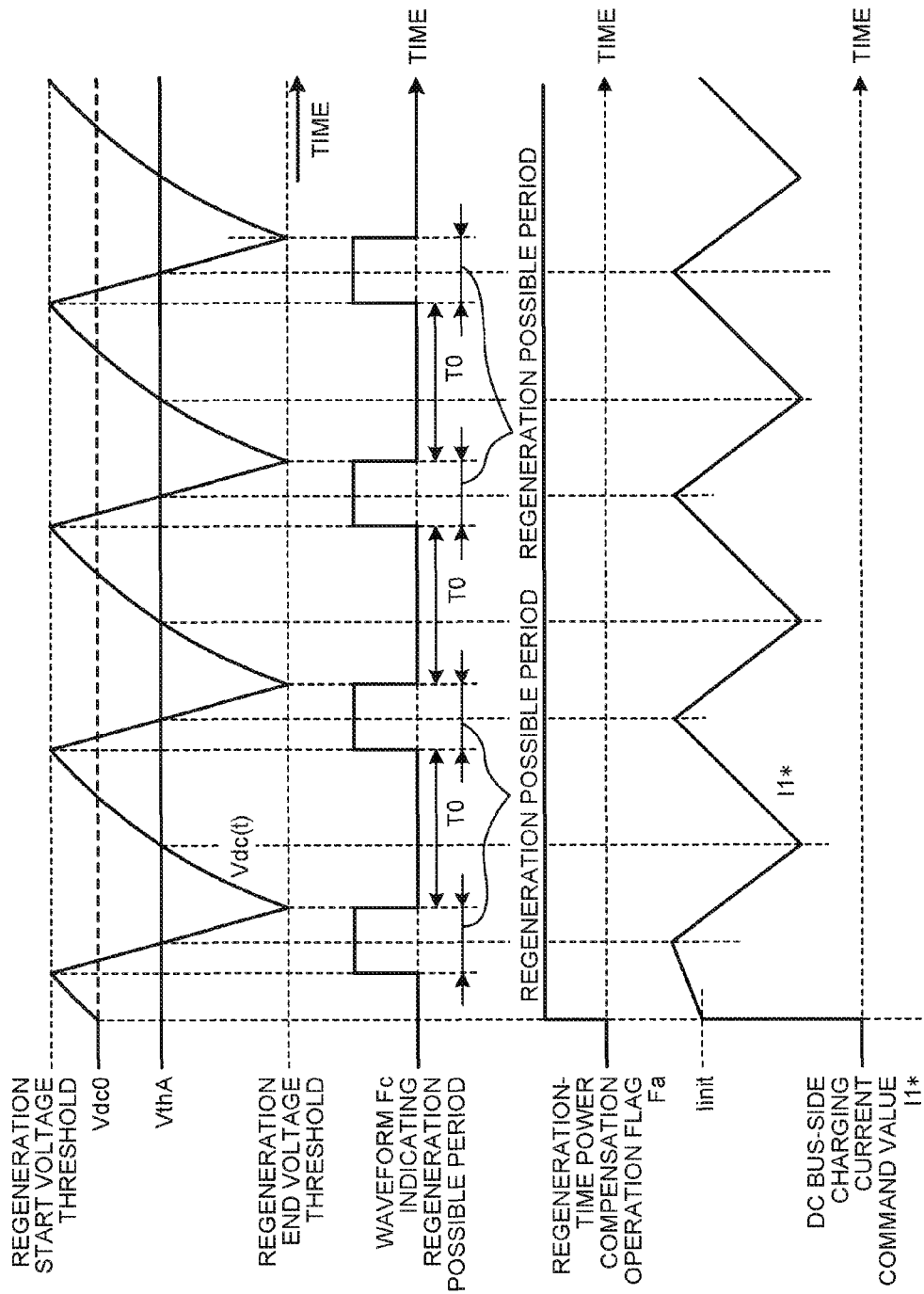
FIG. 8 is a schematic diagram illustrating the relationship between the DC bus voltage value Vdc(t) and a DC bus-side charging current command value I1* at the converter regeneration time according to the first embodiment.

FIG. 8 is a schematic diagram illustrating the relationship between the DC bus voltage value Vdc(t) and the DC bus-side charging current command value I1* at the converter regeneration time, and schematically illustrates the waveforms of the DC bus voltage value Vdc(t), a waveform Fc indicating regeneration possible periods, the regeneration-time power compensation operation flag Fa, and the DC bus-side charging current command value I1* when the regeneration operation of the converter 11 continues in the intermittent regeneration mode of the converter 11. When the AC motor 16 regenerates regenerative power for the DC bus 12 via the inverter 14, the DC bus voltage value Vdc(t) rises from Vdc0, the regeneration-time power compensation operation flag Fa indicates valid, and the DC bus-side charging current command value I1* is set to the regeneration-time current-command-value-integral-component initial value Iinit. The DC bus voltage value Vdc(t) continues to rise, a value obtained by subtracting the regeneration-time DC bus voltage command value VthA from the DC bus voltage value Vdc(t) increases, and the DC bus-side charging current command value I1* increases its value to increase the amount of charge. While the DC bus-side charging current command value I1* is rising, the DC bus voltage value Vdc(t) reaches the regeneration start voltage threshold, and the converter 11 starts the regeneration operation. Even when the converter 11 starts the regeneration operation, the DC bus-side charging current command value I1* continues to rise for a period during which a value obtained by subtracting the regeneration-time DC bus voltage command value VthA from the DC bus voltage value Vdc(t) is a positive value. When the value obtained by subtracting the regeneration-time DC bus voltage command value VthA from the DC bus voltage value Vdc(t) becomes a negative value, the DC bus-side charging current command value I1* starts to drop. When the DC bus voltage value Vdc(t) drops to the regeneration end voltage threshold, the converter 11 ends the regeneration operation. With the end of the regeneration operation of the converter 11, the DC bus voltage value Vdc(t) starts to rise. However, the DC bus-side charging current command value I1* continues to drop for a period during which the value obtained by subtracting the regeneration-time DC bus voltage command value VthA from the DC bus voltage value Vdc(t) is a negative value. When the value obtained by subtracting the regeneration-time DC bus voltage command value VthA from the DC bus voltage value Vdc(t) becomes a positive value, the DC bus-side charging current command value I1* starts to rise. Thereafter, the DC bus voltage value Vdc(t) moves between the regeneration start voltage threshold and the regeneration end voltage threshold. A time interval T0 from when the DC bus voltage value Vdc(t) reaches the regeneration end voltage threshold until when it reaches the regeneration start voltage threshold is a constant value that depends on the regeneration-time DC bus voltage command value VthA [V] and the capacitance C[F] of the smoothing capacitor 13 when errors due to ripples of the converter 11 are excluded.

Figure 9:
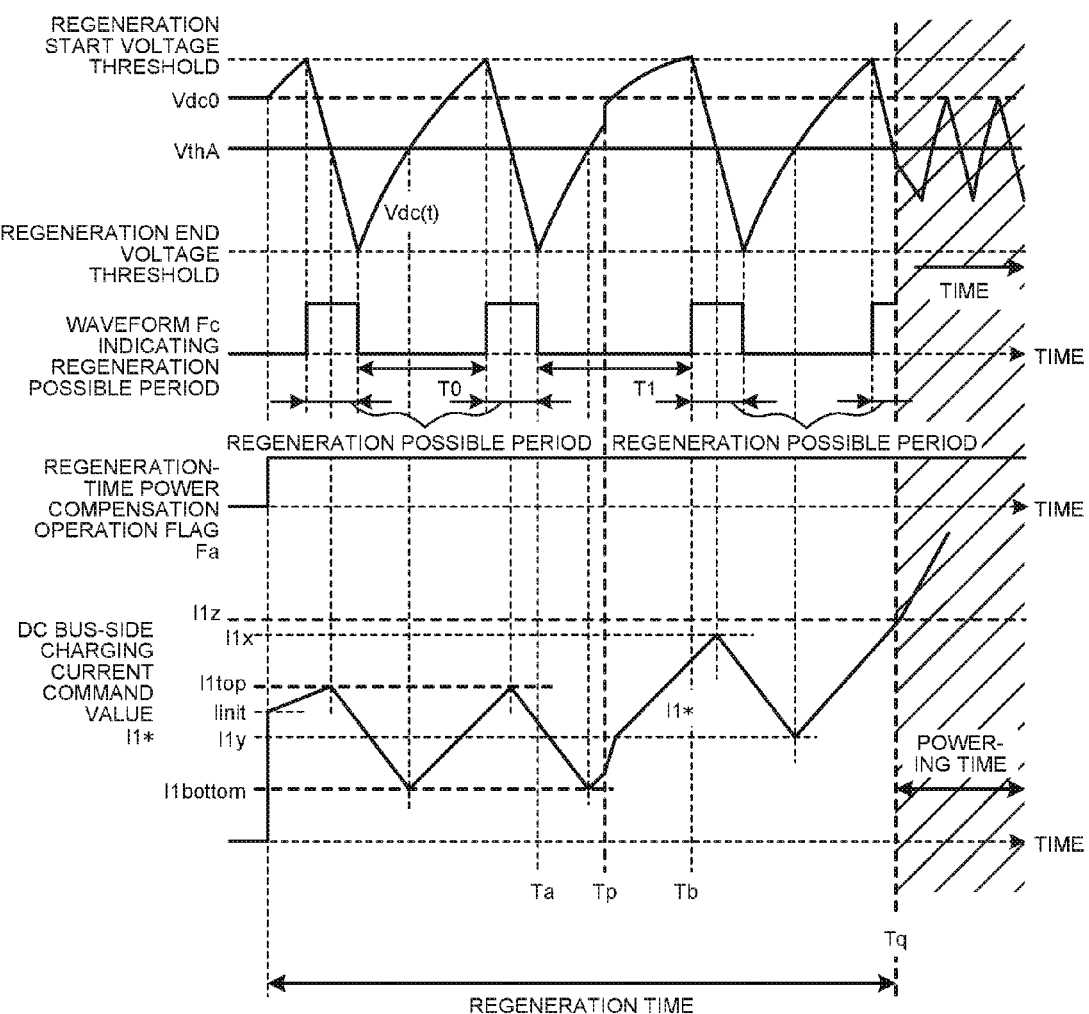
FIG. 9 is a schematic diagram illustrating an example of the relationship between the DC bus voltage value Vdc(t) and the DC bus-side charging current command value I1* when the converter transitions from the regeneration operation to the powering operation according to the first embodiment.

Next, a case will be described where the regeneration-time charging current command value suppressor 45 is not included, i.e., where the regeneration-time charging-current-command-value suppression flag S, which is the output of the regeneration-time charging current command value suppressor 45, does not become valid. FIG. 9 is a schematic diagram illustrating an example of the relationship between the DC bus voltage value Vdc(t) and the DC bus-side charging current command value I1* when the converter transitions from the regeneration operation to the powering operation, and is a diagram illustrating an example of a case where noise comes into the DC bus voltage value Vdc(t) or the DC bus voltage value Vdc(t) temporarily fluctuates. Suppose that, with the converter 11 in the intermittent regeneration mode, a temporal fluctuation occurs in the DC bus voltage value Vdc(t) in a voltage value rising direction at a time Tp illustrated in FIG. 9 at which the waveform Fc indicating the regeneration possible period is not valid. The regeneration-time voltage difference value Ev, which is a value obtained by subtracting the regeneration-time DC bus voltage command value VthA from the DC bus voltage value Vdc(t) with the first subtractor 411 in the charging current command value generator 4 illustrated in FIG. 7, increases; therefore, the DC bus-side charging current command value I1* increases. With the increase of the DC bus-side charging current command value I1*, charging current to the power storage device 17 increases and the rise of the DC bus voltage value Vdc(t) slows. The DC bus voltage value Vdc(t) with a slowing rise takes time to reach the regeneration start voltage threshold. A time interval T1 between the time at which the DC bus voltage value Vdc(t) reaches the regeneration end voltage threshold immediately before the time Tp (time Ta in FIG. 9) and the time at which the DC bus voltage value Vdc(t) with a slowing rise reaches the regeneration start voltage threshold (time Tb in FIG. 9) is longer than the above-described time interval T0. After the time Tb, the converter 11 transitions to the regeneration operation, and the DC bus voltage value Vdc(t) drops to the regeneration end voltage threshold. During the period of the time interval T1 that is longer than the time interval T0, the charging current command value generator 4, using an integration function included therein, causes the DC bus-side charging current command value I1* to rise to a value (value I1x in FIG. 9) higher than the normal highest rising value (I1top in FIG. 9) of the DC bus side charging current command value I1*, and then to turn to drop. Because the time interval of a period during which the DC bus voltage value Vdc(t) is lower than the regeneration-time DC bus voltage command value VthA [V] is the same as that in normal times, the DC bus-side charging current command value I1* is caused to drop only to a value (value I1y in FIG. 9) higher than the normal lowest dropping value (I1bottom in FIG. 9), and starts to rise again. After the time (time Tq in FIG. 9) at which the DC bus-side charging current command value I1* rising from the value I1y exceeds a value of the DC bus-side charging current command value I1* (value I1z in FIG. 9) for an amount that is enough to store all the regenerative power from the AC motor 16 in the power storage device 17, the converter 11 transitions to the powering operation to cover charging current. When the regeneration-time DC bus voltage command value VthA is 540 [V] and the regenerative power from the AC motor 16 is −150 [kW], the value I1z is 278 [A] from Expression (3) above.

Figure 10:
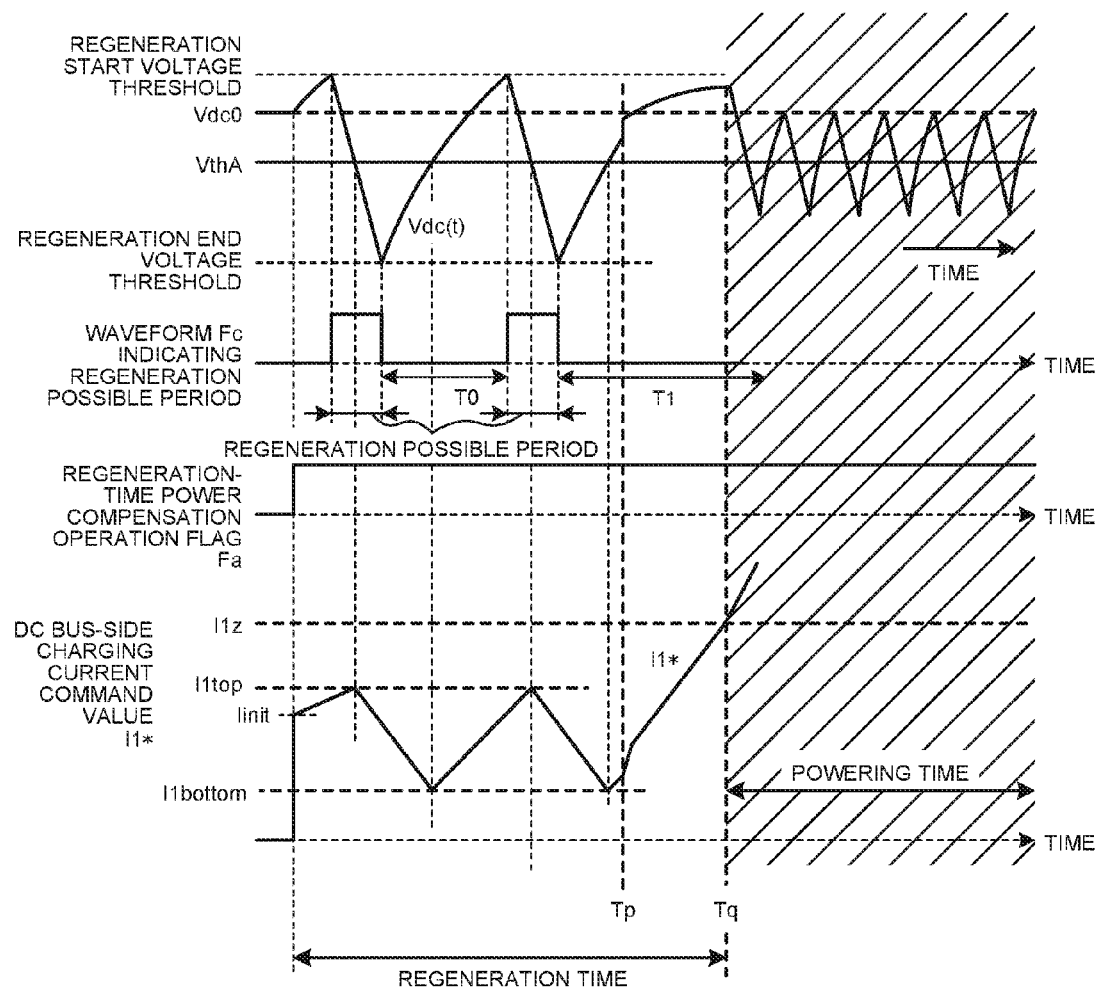
FIG. 10 is a schematic diagram illustrating an example of the relationship between the DC bus voltage value Vdc(t) and the DC bus-side charging current command value I1* when the converter transitions from the regeneration operation to the powering operation according to the first embodiment.

Further, an explanation will be given of another example of a case where noise comes into the DC bus voltage value Vdc(t) or the DC bus voltage value Vdc(t) temporarily fluctuates. FIG. 10 is a schematic diagram illustrating an example of the relationship between the DC bus voltage value Vdc(t) and the DC bus-side charging current command value I1* when the converter transitions from the regeneration operation to the powering operation. Suppose that, with the converter 11 in the intermittent regeneration mode, a temporal fluctuation occurs in the DC bus voltage value Vdc(t) in a voltage value rising direction at a time Tp illustrated in FIG. 10 at which the waveform Fc indicating regeneration possible periods is not valid. The regeneration-time voltage difference value Ev, which is a value obtained by subtracting the regeneration-time DC bus voltage command value VthA from the DC bus voltage value Vdc(t) with the first subtractor 411 in the charging current command value generator 4 illustrated in FIG. 7 increases; therefore, the DC bus-side charging current command value I1* increases. With the increase of the DC bus-side charging current command value I1*, charging current to the power storage device 17 increases and the rise of the DC bus voltage value Vdc(t) slows. After the time (time Tq in FIG. 10) at which the DC bus-side charging current command value I1* exceeds a value of the DC bus-side charging current command value I1* (value I1z in FIG. 10) for an amount that is enough to store all the regenerative power from the AC motor 16 in the power storage device 17 before the DC bus voltage value Vdc(t) with a slowing rise reaches the regeneration start voltage threshold, the converter 11 transitions to the powering operation to cover charging current. When the converter 11 starts the powering operation, the DC bus-side charging current command value I1* is controlled such that the DC bus voltage value Vdc(t) has the same value as the regeneration-time DC bus voltage command value VthA [V], and the DC bus voltage value Vdc(t) does not exceed the regeneration start voltage threshold again. Consequently, after the time at which the DC bus voltage value Vdc(t) reaches the regeneration end voltage threshold immediately before the time Tp, the waveform Fc indicating regeneration possible periods does not become valid. That is, the time interval T1 in FIG. 10 is left undetermined indefinitely. When the regeneration-time DC bus voltage command value VthA is 540 [V] and the regenerative power from the AC motor 16 is −150 [kW], the value I1z is 278 [A] from Expression (3) above.

The above is a description of a unit for obtaining, by the charging current command value generator 4, the DC bus-side charging current command value I1*, which is a charging current command value on the DC bus 12 side to charge the power storage device 17 with power exceeding power based on the regeneration-time DC bus voltage command value VthA (i.e. the regeneration-time voltage threshold −PthA), from the DC bus voltage value Vdc(t) when the regeneration-time charging-current-command-value suppression flag S, which is the output of the regeneration-time charging current command value suppressor 45, is not valid. The following is a description of the functions of the regeneration-time charging current command value suppressor 45 in the charging current command value generator 4 and is a description of the operation of the charging current command value generator 4, i.e., the behavior of the DC bus-side charging current command value I1* when the regeneration-time charging-current-command-value suppression flag S, which is the output of the regeneration-time charging current command value suppressor 45, is valid.

In order to prevent a phenomenon in which a rise of the DC bus-side charging current command value I1* due to a disturbance in the DC bus voltage value Vdc(t) described with reference to FIGS. 9 and 10 causes the converter 11 to transition from the regeneration operation to the powering operation, the regeneration-time charging current command value suppressor 45 in the charging current command value generator 4 in the present embodiment receives input of the DC bus voltage value Vdc(t), the regeneration-time DC bus voltage command value VthA, and the regeneration-time power compensation operation flag Fa, generates the regeneration-time charging-current-command-value suppression flag S, and outputs the generated regeneration-time charging-current-command-value suppression flag S to the second switch 415, the third switch 422, and the fifth switch 435 in the charging current command value generator 4. The regeneration-time charging-current-command-value suppression flag S is valid when the second switch 415 outputs zero as the regeneration-time charging-current-command-value proportional component value Ip* as its output, the third switch 422 outputs zero as the value Ii as its output, and the fifth switch 435 outputs zero as the regeneration-time charging-current-command-value differential component value Id* as its output.

Figure 11:
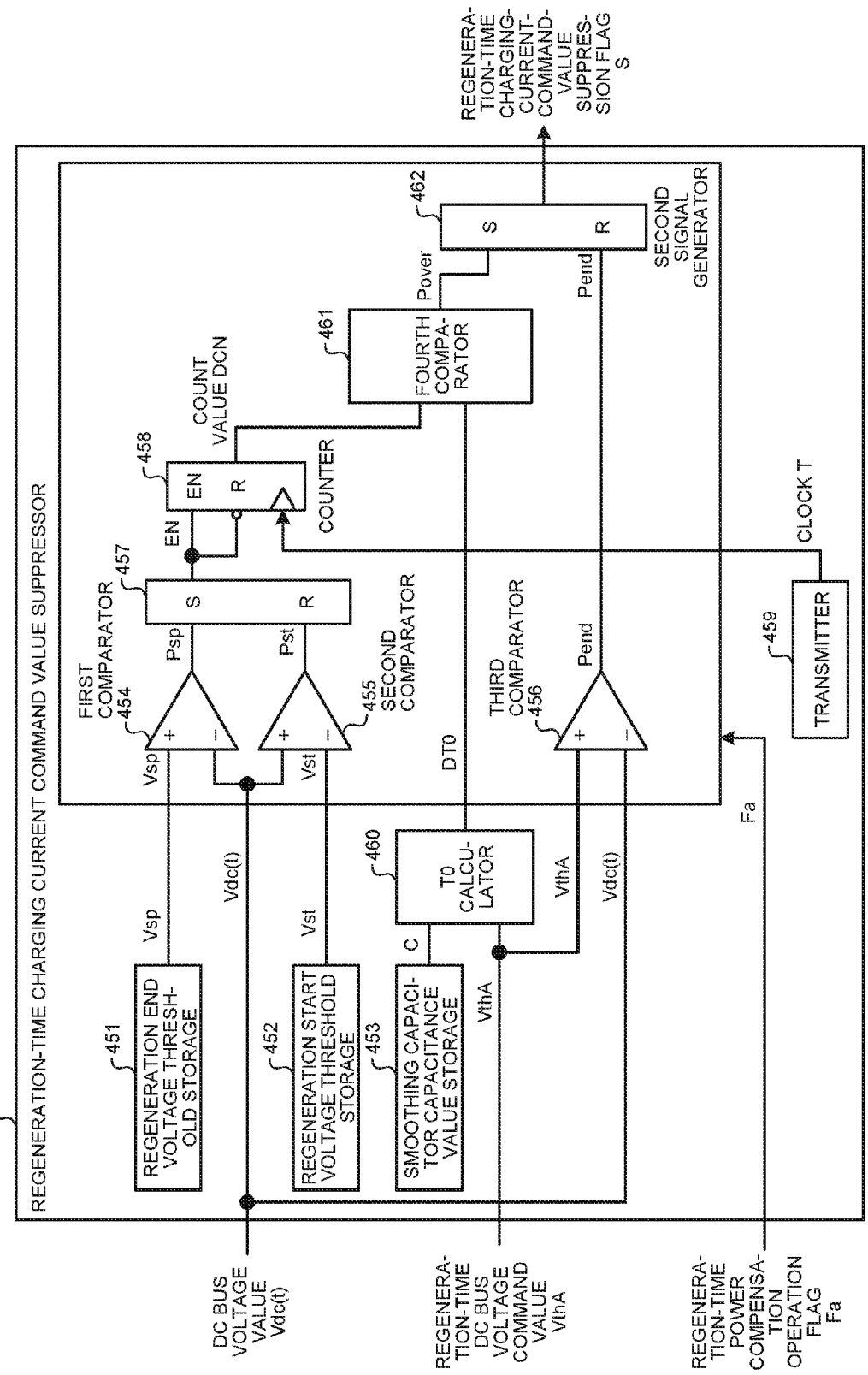
FIG. 11 is a block diagram illustrating a regeneration-time charging current command value suppressor according to the first embodiment.

FIG. 11 is a block diagram illustrating the regeneration-time charging current command value suppressor 45. The regeneration-time charging current command value suppressor 45 includes a regeneration end voltage threshold storage 451, a regeneration start voltage threshold storage 452, a smoothing capacitor capacitance value storage 453, a first comparator 454, a second comparator 455, a third comparator 456, a first signal generator 457, a counter 458, a transmitter (oscillator) 459, a T0 calculator 460, a fourth comparator 461, and a second signal generator 462. The regeneration end voltage threshold storage 451 stores a regeneration end voltage threshold, which is a voltage value at which the converter 11 ends the regeneration operation illustrated in FIGS. 8, 9, and 10, generates a voltage value Vsp slightly higher than the regeneration end voltage threshold, and outputs the voltage value Vsp to the first comparator 454. Here, the reason the voltage value Vsp to be output is a voltage value slightly higher than the regeneration end voltage threshold is for the removal of the effects of noise in the DC bus voltage value Vdc(t) input to the regeneration-time charging current command value suppressor 45. Here, the difference between the voltage value Vsp slightly higher than the regeneration end voltage threshold and the regeneration end voltage threshold is a predetermined constant that is determined depending on the magnitude of noise in the DC bus voltage value Vdc(t), which, for example, may be 5% or less of the regeneration end voltage threshold. The regeneration start voltage threshold storage 452 stores a regeneration start voltage threshold, which is a voltage value at which the converter 11 starts the regeneration operation illustrated in FIGS. 8, 9, and 10, generates a voltage value Vst slightly lower than the regeneration start voltage threshold, and outputs the voltage value Vst to the second comparator 455. Here, the reason the voltage value Vst to be output is a voltage value slightly lower than the regeneration start voltage threshold is for the removal of the effects of noise in the DC bus voltage value Vdc(t) input to the regeneration-time charging current command value suppressor 45. Here, the difference between the voltage value Vst slightly lower than the regeneration start voltage threshold and the regeneration start voltage threshold is a predetermined constant that is determined depending on the magnitude of noise in the DC bus voltage value Vdc(t), which, for example, may be 5% or less of the regeneration start voltage threshold. The smoothing capacitor capacitance value storage 453 stores the value of C[F], which is the capacitance value of the smoothing capacitor 13, and outputs it to the T0 calculator 460. The first comparator 454 receives input of the DC bus voltage value Vdc(t) and the voltage value Vsp, which is the output of the regeneration end voltage threshold storage 451, generates a regeneration end signal Psp that becomes valid when the DC bus voltage value Vdc(t) becomes lower than or equal to the voltage value Vsp, which is the threshold, and outputs the regeneration end signal Psp to the first signal generator 457. The second comparator 455 receives input of the DC bus voltage value Vdc(t) and the voltage value Vst, which is the output of the regeneration start voltage threshold storage 452, generates a regeneration start signal Pst that becomes valid when the DC bus voltage value Vdc(t) becomes higher than or equal to the voltage value Vst, which is the threshold, and outputs the regeneration start signal Pst to the first signal generator 457. The third comparator 456 receives input of the DC bus voltage value Vdc(t) and the regeneration-time DC bus voltage command value VthA, generates a suppression end signal Pend that becomes valid when the DC bus voltage value Vdc(t) becomes lower than or equal to the regeneration-time DC bus voltage command value VthA, and outputs the suppression end signal Pend to the second signal generator 462. The first signal generator 457 receives input of the regeneration end signal Psp and the regeneration start signal Pst, generates an enable signal EN that is valid for a period between the time at which the regeneration end signal Psp becomes valid and the time at which the regeneration start signal Pst becomes valid, and outputs the enable signal EN to the counter 458. The transmitter 459 generates a clock T used by the counter 458 as a counting unit. The frequency of the clock T is set to a magnitude that allows the counter 458 to fully identify the extension or reduction in time of a period during which the regeneration operation is not performed in the intermittent regeneration mode of the converter 11. For the frequency of the clock T, for example, a frequency about 50 times to 400 times the frequency of the system power supply 10 (50 Hz or 60 Hz) may be used. The counter 458 counts rising edges of the clock T, which is the output of the transmitter 459, only for a period during which the enable signal EN is valid, and outputs the counting result as a count value DCN to the fourth comparator 461. During a period in which the enable signal EN is not valid, the counter 458 resets the counting result (to zero), and waits until a period during which the next enable signal EN becomes valid. The T0 calculator 460 receives input of the regeneration-time DC bus voltage command value VthA and the capacitance value C of the smoothing capacitor 13, which is the output of the smoothing capacitor capacitance value storage 453, and, by using a mathematical formula, a look-up table, or the like, generates a value by converting, into the clock T, the time interval T0 of a period during which the waveform Fc indicating a regeneration possible period in the intermittent regeneration mode of the converter 11 is not valid illustrated in FIGS. 8, 9, and 10. The T0 calculator 460 calculates a conversion value DT0, which is a value slightly larger than the time interval T0 (i.e., DT0−T0>0), with respect to the conversion value of the time interval T0 based on the clock T generated in the T0 calculator 460 while taking into account the DC bus voltage value Vdc(t), and outputs it to the fourth comparator 461. Here, the difference between the value slightly larger than the conversion value DT0 and the time interval T0 is a predetermined constant that is determined depending on the magnitude of noise in the DC bus voltage value Vdc(t), which, for example, may be 1% or less of the time interval T0. The fourth comparator 461 receives input of the count value DCN, which is the output of the counter 458, and the conversion value DT0, which is the output of the T0 calculator 460, generates a suppression start signal Pover that becomes valid when the count value DCN becomes the conversion value DT0 or higher, and outputs the suppression start signal Pover to the second signal generator 462. The second signal generator 462 receives input of the suppression start signal Pover and the suppression end signal Pend, generates the regeneration-time charging-current-command-value suppression flag S that is valid for a period between the time at which the suppression start signal Pover becomes valid and the time at which the suppression end signal Pend becomes valid, and outputs it to the second switch 415, the third switch 422, and the fifth switch 435 in the charging current command value generator 4. The regeneration-time power compensation operation flag Fa, when not valid, keeps the first comparator 454, the second comparator 455, the third comparator 456, the first signal generator 457, the fourth comparator 461, and the second signal generator 462 in a non-valid state, and resets the counter 458. That is, the regeneration-time charging current command value suppressor 45 functions only when the regeneration-time power compensation operation flag Fa is valid. When the regeneration-time power compensation operation flag Fa is not valid, the regeneration-time charging-current-command-value suppression flag S maintains the non-valid state. The value stored in the regeneration end voltage threshold storage 451 or the regeneration start voltage threshold storage 452, the capacitance value C[F] stored in the smoothing capacitor capacitance value storage 453, or the mathematical formula or values in the look-up table stored in the T0 calculator 460 may be set as appropriate according to the configuration of the AC motor drive system 1. The regeneration end voltage threshold storage 451, the regeneration start voltage threshold storage 452, the smoothing capacitor capacitance value storage 453, and the T0 calculator 460 have a configuration that allows a user to enter the respective values or the mathematical formula. In the present embodiment, a unit for storing the capacitance value C[F] of the smoothing capacitor 13 is provided to both of the smoothing capacitor capacitance value storage 62 in the regeneration-time power/voltage converter 6 and the smoothing capacitor capacitance value storage 453 in the regeneration-time charging current command value suppressor 45 in the charging current command value generator 4, but may be consolidated into one of them to output the capacitance value C[F] of the smoothing capacitor 13 to the other.

Figure 12:
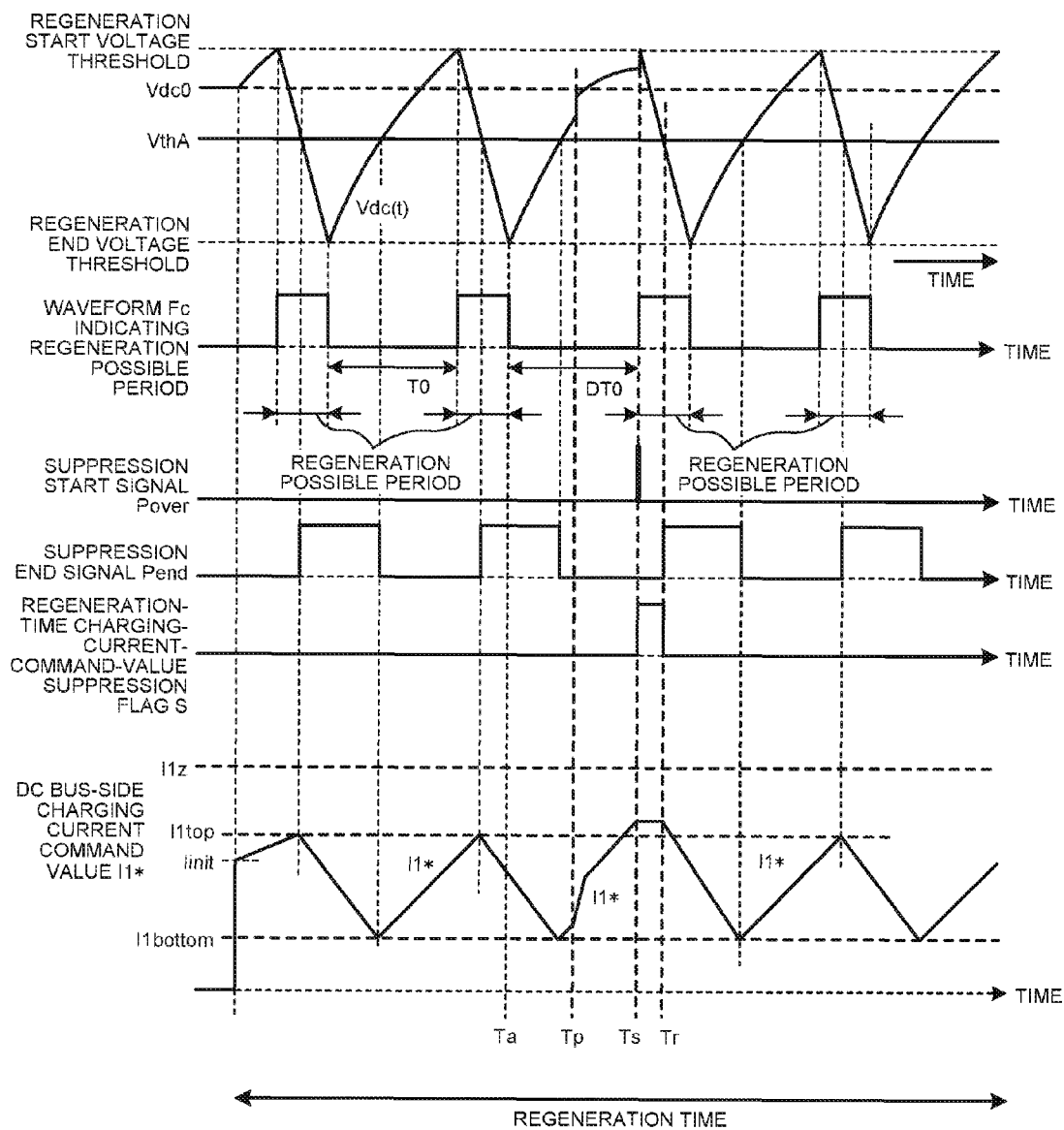
FIG. 12 is a time diagram illustrating an example of an operation of the regeneration-time charging current command value suppressor preventing the converter from transitioning from the regeneration operation to the powering operation according to the first embodiment.
Figure 13:
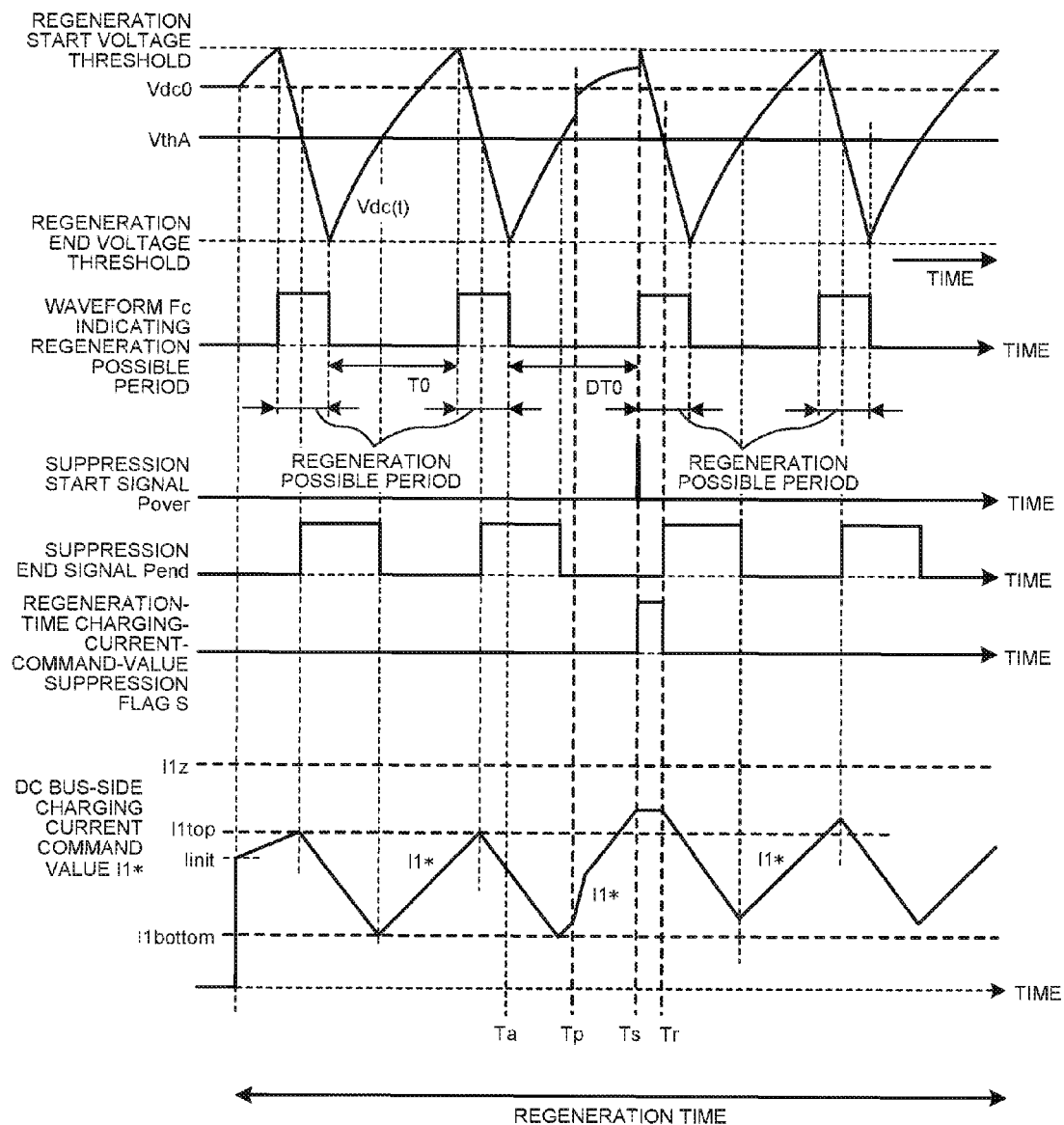
FIG. 13 is a time diagram illustrating another example of the operation of the regeneration-time charging current command value suppressor preventing the converter from transitioning from the regeneration operation to the powering operation according to the first embodiment.

FIG. 12 is a time diagram illustrating an example of an operation of the regeneration-time charging current command value suppressor to prevent the converter from transitioning from the regeneration operation to the powering operation, and is a diagram illustrating an operation when the regeneration-time charging-current-command-value suppression flag S, which is the output of the regeneration-time charging current command value suppressor 45, is valid in the situation illustrated in FIG. 9. FIG. 13 is a time diagram illustrating another example of an operation of the regeneration-time charging current command value suppressor to prevent the converter from transitioning from the regeneration operation to the powering operation, and is a diagram illustrating an operation when the regeneration-time charging-current-command-value suppression flag S, which is the output of the regeneration-time charging current command value suppressor 45, is valid in the situation illustrated in FIG. 10.

In FIG. 12, as in FIG. 9, suppose that a temporary fluctuation occurs in the DC bus voltage value Vdc(t) in the voltage value rising direction at a time Tp. In FIG. 12, the DC bus-side charging current command value I1* increases, and the rise of the DC bus voltage value Vdc(t) slows. Before the DC bus voltage value Vdc(t) reaches the regeneration start voltage threshold, the count value DCN of the counter 458 in the regeneration-time charging current command value suppressor 45 exceeds the value of the conversion value DT0, which is the output of the T0 calculator 460 (a time Ts in FIG. 12). At the time Ts, the regeneration-time charging-current-command-value suppression flag S becomes valid, and the second switch 415, the third switch 422, and the fifth switch 435 in the charging current command value generator 4 cause the DC bus-side charging current command value I1* to maintain the value at the time Ts. By the DC bus-side charging current command value I1* maintaining a constant value, the charging current to the power storage device 17 does not increase. Because the converter 11 is during a period in which it does not perform the regeneration operation in the intermittent regeneration mode, as illustrated in FIG. 12, the DC bus voltage value Vdc(t) increases rapidly and reaches the regeneration start voltage threshold. When the DC bus voltage value Vdc(t) reaches the regeneration start voltage threshold, the converter 11 performs the regeneration operation, and the DC bus voltage value Vdc(t) starts to drop. Because the conversion value DT0, which is a time interval, does not have much difference from the time interval T0, the constant value maintained by the DC bus-side charging current command value I1* is limited to a value slightly larger than the I1top, which is the normal highest rising value of the DC bus-side charging current command value I1*. At a time Tr when the DC bus voltage value Vdc(t) continuing to drop becomes the regeneration-time DC bus voltage command value VthA or lower, the suppression end signal Pend, which is the output of the third comparator 456 in the regeneration-time charging current command value suppressor 45, becomes valid, and the regeneration-time charging-current-command-value suppression flag S ceases to be valid. Because the regeneration-time charging-current-command-value suppression flag S ceases to be valid, the second switch 415, the third switch 422, and the fifth switch 435 in the charging current command value generator 4 cause the charging current command value generator 4 to restore the PID function. After the time Tr, the DC bus voltage value Vdc(t) is a value smaller than the regeneration-time DC bus voltage command value VthA, and thus the DC bus-side charging current command value I1* drops. The operation of the charging current command value generator 4 as above prevents the DC bus-side charging current command value I1* from exceeding the value I1z of the DC bus-side charging current command value I1* for an amount that is enough to store all the regenerative power from the AC motor 16 in the power storage device 17, and the intermittent regeneration mode of the converter 11 continues.

As illustrated in FIG. 13, even when a rise of the DC bus-side charging current command value I1* after the time Tp is rapid and a rise of the DC bus voltage value Vdc(t) slows greatly, the conversion value DT0, which is a time interval from the time Ta, comes as in the case illustrated in FIG. 12; therefore, at the time Ts, the DC bus-side charging current command value I1* maintains a constant value. The operation of the charging current command value generator 4 after the DC bus-side charging current command value I1* maintains the constant value is similar to the operation illustrated with FIG. 12. Thus, also in the case illustrated in FIG. 13, the DC bus-side charging current command value I1* does not exceed the value I1z of the DC bus-side charging current command value for an amount that is enough to store all the regenerative power from the AC motor 16 in the power storage device 17, and the intermittent regeneration mode of the converter 11 continues.

In the above description, the counter 458 counts a time interval from the regeneration end signal Psp. Alternatively it may count a time interval from the regeneration start signal Pst. However, when the regeneration start signal Pst is set as a reference for counting, the regeneration end voltage threshold storage 451, the first comparator 454, and the first signal generator 457 are omitted, and the regeneration start signal Pst directly becomes a reset signal of the counter 458. The enable function of the counter 458 in this case is always set in a counting state.

Although the case where the charging current command value generator 4 performs the PID control has been described above, the present invention is not limited to this. The charging current command value generator 4 may perform PI control or I control. Although the case where the charging current command value generator 4 is implemented by hardware has been described as an example, the present invention is not limited to this. The charging current command value generator 4 may be partly or entirely implemented by software.

The powering-time controller 21, the current command value integrator 22, the control signal generator 23, and the regeneration-time power compensation operation controller 5, the regeneration-time power/voltage converter 6, and the charging current command value converter 7 in the regeneration-time controller 3 may be implemented by hardware or may be implemented by software.

Although the present embodiment has been described by illustrating the power supply regeneration type converter as the converter 11, the present invention is not limited to this. The converter 11 may be a resistance regeneration type converter. When the converter 11 is a resistance regeneration type converter, power regeneration from the DC bus 12 for the system power supply 10 can be read as power consumption in a regenerative resistor in the resistance regeneration type converter, thereby preventing the converter 11 during the regeneration operation from transitioning to the powering operation.

The AC motor drive system in the present embodiment described above includes a converter that supplies DC power; an inverter that converts the DC power into AC power; a DC bus that connects the converter and the inverter; an AC motor that is driven by the AC power; a DC voltage value detector that detects a DC voltage value on an output side of the converter; a power storage device that stores the DC power from the DC bus and releases the stored DC power to the DC bus; a charging and discharging circuit that is connected to the DC bus and is in parallel with the inverter, and charges and discharges the power storage device; a charging and discharging current value detector that detects a charging and discharging current value of the power storage device; and a charge and discharge controller that outputs a control signal to control the charging and discharging circuit on a basis of the DC voltage value and the charging and discharging current value. When regenerative power from the AC motor via the inverter exceeds a predetermined power threshold, the charge and discharge controller causes the power storage device to be charged such that the DC voltage value becomes a voltage threshold corresponding to the power threshold, when the regenerative power is lower than or equal to the power threshold, the converter performs a regeneration operation when the DC voltage value rises to reach a predetermined regeneration start voltage threshold and ends the regeneration operation when the DC voltage value drops to reach a predetermined regeneration end voltage threshold, and a time average value of the DC voltage value during the regeneration operation in the converter is lower than the DC voltage value at no-load time when the converter does not perform power supply and regeneration. Moreover, the charge and discharge controller may perform control so as to maintain constant current with which the power storage device is charged only during a period based on a cycle in which the DC bus voltage value reaches a voltage threshold based on a DC bus voltage value at which the converter starts the regeneration operation. The period based on the cycle in which the DC bus voltage value reaches the voltage threshold based on the DC bus voltage value at which the converter starts the regeneration operation, may start at a time when a time after the DC bus voltage value reaches the regeneration end voltage threshold exceeds a preset time based on the voltage threshold corresponding to the power threshold, and end at a time when the DC bus voltage value next reaches the voltage threshold corresponding to the power threshold.

Even when the average voltage value of the DC bus at the converter regeneration time is a voltage value lower than the DC bus voltage value at no-load time, the AC motor drive system in the present embodiment described above can suppress a peak of power regenerated by the converter for the system power supply, on the basis of the DC bus voltage value rise in an early stage of AC motor regeneration, without determining the direction of DC bus current (whether the current value is positive or negative). Further, even when the average voltage value of the DC bus at the converter regeneration time is a voltage value lower than the DC bus voltage value at no-load time, a constant DC bus-side charging current command value is maintained, on the basis of the length of time until the DC bus voltage value changes from a predetermined voltage value to another predetermined value, without depending on the current value of the DC bus (including the direction of current), whereby the converter can be prevented from supplying power from the system power supply to the DC bus even though the AC motor is regenerating power. Furthermore, because the average voltage value of the DC bus at the converter regeneration time is a voltage value lower than the DC bus voltage value at no-load time, there is no need to use high-breakdown voltage devices for the smoothing capacitor, the inverter, the charging and discharging circuit, and others; therefore, the AC motor drive system can be configured at a low cost. Because the average voltage value of the DC bus at the converter regeneration time is a voltage value lower than the DC bus voltage value at no-load time, the lives of devices such as the smoothing capacitor, the inverter, and the charging and discharging circuit can be extended.

Second Embodiment

Figure 14:
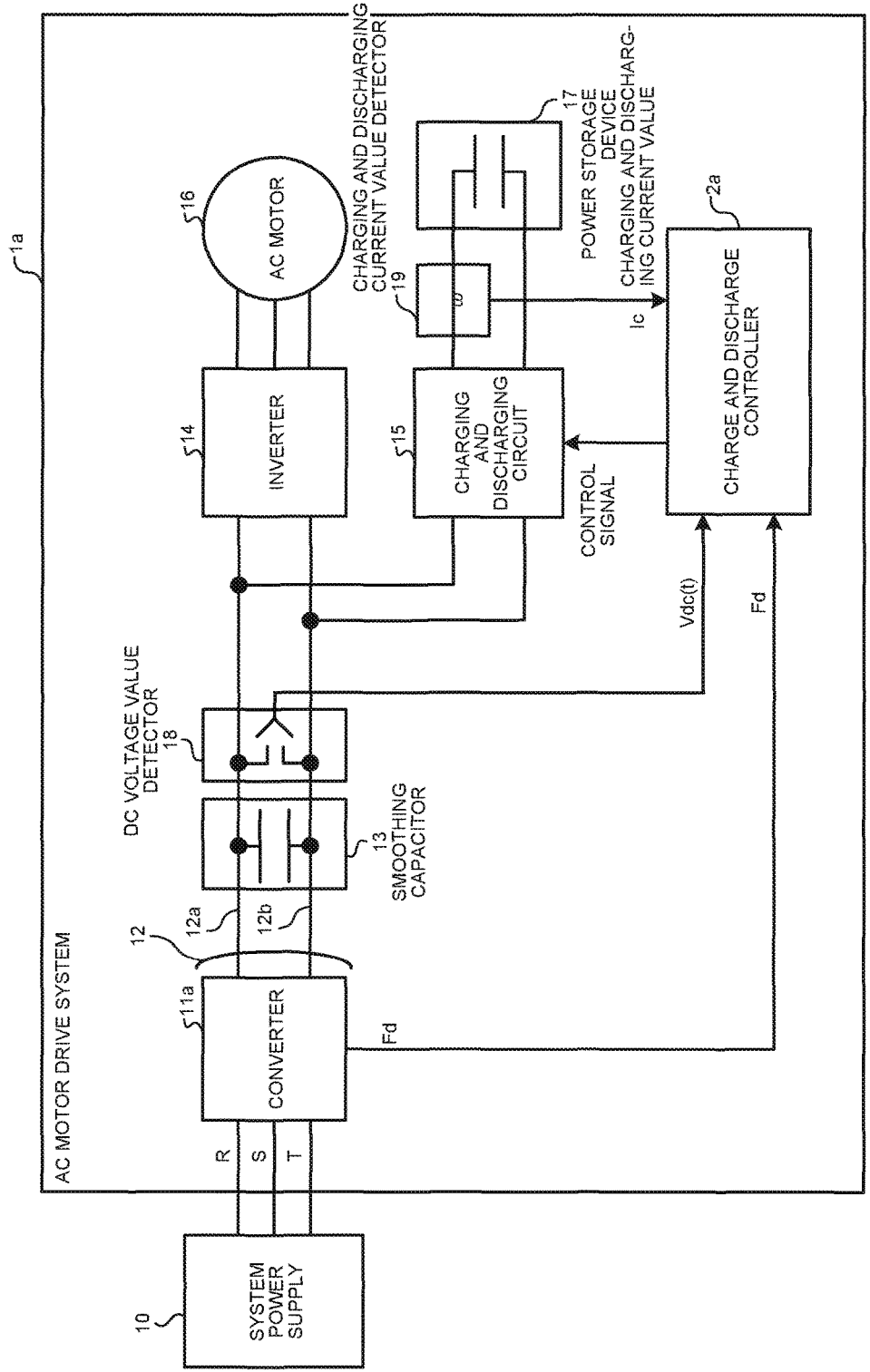
FIG. 14 is a block diagram illustrating the entire configuration of an AC motor drive system according to a second embodiment.

FIG. 14 is a block diagram illustrating the entire configuration of a second embodiment of an AC motor drive system according to the present invention. An AC motor drive system 1a illustrated in FIG. 14 includes a charge and discharge controller 2a, a converter 11a, the DC bus 12, the smoothing capacitor 13, the inverter 14, the charging and discharging circuit 15, the AC motor 16, the power storage device 17, the DC voltage value detector 18, and the charging and discharging current value detector 19. The converter 11a outputs a regeneration period flag Fd to the charge and discharge controller 2a. The regeneration period flag Fd is a signal indicating validity only for a period during which the converter 11a regenerates power from the DC bus 12 for the system power supply 10. At no-load time or when the converter 11a supplies power from the system power supply 10 to the DC bus 12, the regeneration period flag Fd is not valid. The AC motor drive system 1a in the present embodiment illustrated in FIG. 14 is different from the AC motor drive system 1 in the first embodiment illustrated in FIG. 1 in that it includes the converter 11a that outputs the regeneration period flag Fd and the charge and discharge controller 2a that is fed with the regeneration period flag Fd. In the present embodiment, components identical or equivalent to those in the first embodiment are denoted by identical names and numerals, and will not be described.

When the converter 11a is a power supply regeneration type converter, as illustrated in the first embodiment, power is regenerated from the DC bus 12 for the system power supply 10 by controlling the repeated on/off switching of the switching devices in the converter 11a during a period between a regeneration start voltage threshold and a regeneration end voltage threshold. Therefore, the power supply regeneration type converter has a signal that indicates that it is during the period between the regeneration start voltage threshold and the regeneration end voltage threshold, and it outputs this signal as the regeneration period flag Fd. Conversely, when the converter 11a is a resistance regeneration type converter, part of the regenerative power from the AC motor 16 is consumed by controlling the high-potential-side DC bus 12a and the low-potential-side DC bus 12b such that they are in electrical communication with each other via a regenerative resistor in the converter 11a during a period between a regeneration start voltage threshold and a regeneration end voltage threshold. Therefore, the resistance regeneration type converter has a signal indicating that it is during the period between the regeneration start voltage threshold and the regeneration end voltage threshold, and it outputs this signal as the regeneration period flag Fd to the charge and discharge controller 2a.

The charge and discharge controller 2a in the present embodiment includes a regeneration-time charging current command value suppressor 45a in place of the regeneration-time charging current command value suppressor 45 of the charging current command value generator 4 in the charge and discharge controller 2 in the first embodiment. The regeneration-time charging current command value suppressor 45a in the present embodiment is different in that it is fed with the regeneration period flag Fd in addition to the inputs to the regeneration-time charging current command value suppressor 45. That is, the regeneration period flag Fd input to the charge and discharge controller 2a in the present embodiment is input only to the regeneration-time charging current command value suppressor 45a.

Figure 15:
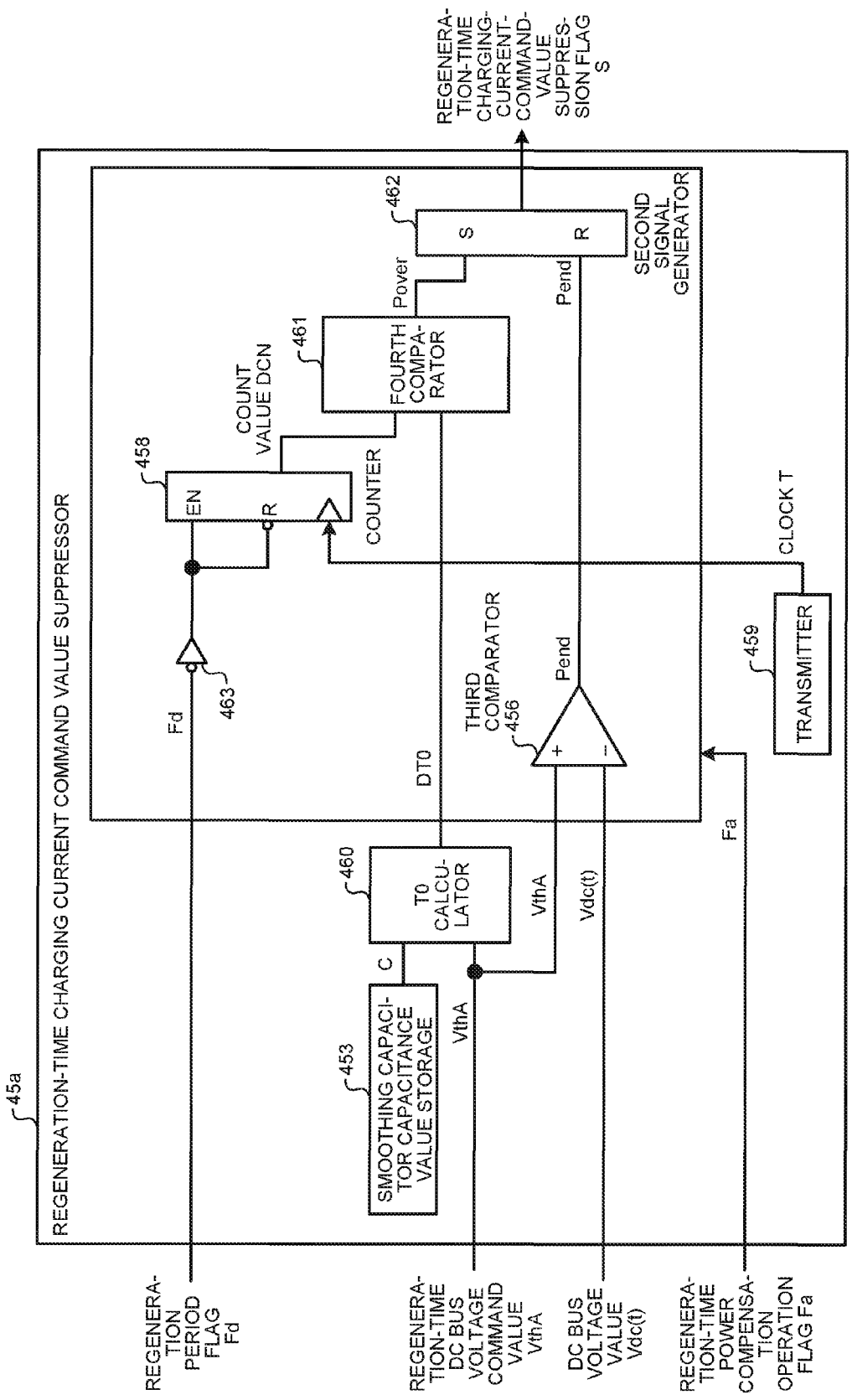
FIG. 15 is a block diagram illustrating a regeneration-time charging current command value suppressor according to the second embodiment.

FIG. 15 is a block diagram illustrating the regeneration-time charging current command value suppressor 45a. The regeneration-time charging current command value suppressor 45a includes the smoothing capacitor capacitance value storage 453, the third comparator 456, the counter 458, the transmitter 459, the T0 calculator 460, the fourth comparator 461, the second signal generator 462, and an inverter 463. The regeneration period flag Fd, which is the output from the converter 11a, is input to the inverter 463. A regeneration-time power compensation operation flag Fa is also input to the inverter 463. The inverter 463 outputs an enable signal EN, which is a signal for the counter 458 downstream to operate only for a period during which the regeneration-time power compensation operation flag Fa is valid and the regeneration period flag Fd is not valid. Conversely, the enable signal EN, which is the output by the inverter 463, indicates a non-valid state when the regeneration-time power compensation operation flag Fa is not valid or during a period in which the regeneration period flag Fd is valid. The inverter 463 outputs the enable signal EN to the counter 458. The transmitter 459 serves the same function as in the first embodiment and outputs a clock T, which is the output of the transmitter 459, to the counter 458. In response to the clock T and the enable signal EN, which is the output of the inverter 463, the counter 458 outputs a count value DCN, which is the output of the counter 458, to the fourth comparator 461 in a similar manner to the counter 458 in the first embodiment. The smoothing capacitor capacitance value storage 453, as in the first embodiment, outputs a capacitance value C, which is the output of the smoothing capacitor capacitance value storage 453, to the T0 calculator 460. The T0 calculator 460 receives input of the regeneration-time DC bus voltage command value VthA, which is the output of a regeneration-time power/voltage converter 6, and the capacitance value C, which is the output of the smoothing capacitor capacitance value storage 453. The T0 calculator 460, as in the first embodiment, outputs a conversion value DT0, which is the output of the T0 calculator 460, to the fourth comparator 461. The third comparator 456 receives input of a DC bus voltage value Vdc(t), which is the output of the DC voltage value detector 18, and the regeneration-time DC bus voltage command value VthA, which is the output of the regeneration-time power/voltage converter 6. The third comparator 456, as in the first embodiment, outputs a suppression end signal Pend, which is the output of the third comparator 456, to the second signal generator 462. The fourth comparator 461 receives input of the count value DCN, which is the output of the counter 458, and the conversion value DT0, which is the output of the T0 calculator 460, generates a suppression start signal Pover that becomes valid when the count value DCN becomes the conversion value DT0 or more, and outputs the suppression start signal Paver to the second signal generator 462. The second signal generator 462 receives input of the suppression start signal Paver and the suppression end signal Pend, generates a regeneration-time charging-current-command-value suppression flag S that is valid for a period between the time at which the suppression start signal Paver becomes valid and the time at which the suppression end signal Pend becomes valid, and outputs it to the second switch 415, the third switch 422, and the fifth switch 435 in the charging current command value generator 4. The regeneration-time power compensation operation flag Fa, when not valid, keeps the third comparator 456, the fourth comparator 461, the second signal generator 462, and the inverter 463 in a non-valid state, and causes the counter 458 to reset. That is, the regeneration-time charging current command value suppressor 45a functions only when the regeneration-time power compensation operation flag Fa is valid. When the regeneration-time power compensation operation flag Fa is not valid, the regeneration-time charging-current-command-value suppression flag S maintains the non-valid state.

Although the present embodiment has been described by illustrating the case where the regeneration-time charging current command value suppressor 45a is implemented by hardware, the present invention is not limited to this. The regeneration-time charging current command value suppressor 45a may be partly or entirely implemented by software. The powering-time controller 21, the current command value integrator 22, the control signal generator 23, and the regeneration-time controller 3 may be implemented by hardware or may be implemented by software.

In the present embodiment, the charge and discharge controller 2a controls the charging and discharging circuit 15 so as to maintain constant current with which the power storage device 17 is charged, on the basis of the cycle in which the regeneration period flag Fd output from the converter 11a becomes valid or the cycle of the period during which it is not valid. That is, the charge and discharge controller 2a maintains constant current with which the power storage device 17 is charged only during a period based on the regeneration period flag Fd. The period based on the regeneration period flag Fd may start at the time when the time during which the regeneration period flag Fd is not valid (indicating that it is not the period to regenerate power) exceeds a preset time based on the voltage threshold corresponding to the power threshold, and it may end at the time when the DC bus voltage value next reaches the voltage threshold corresponding to the power threshold.

In addition to the effects of the AC motor drive system illustrated in the first embodiment, the AC motor drive system in the present embodiment described above can directly identify information on a regeneration period controlled by the converter itself, without estimating the regeneration time of the converter from the DC bus voltage value, and can thus eliminate a time delay of the rise and drop of the DC bus voltage value due to false recognition of the converter operation caused by noise superimposed on the DC bus voltage value or the time constant of the DC bus. Therefore, the AC motor drive system in the present embodiment is more stable than that in the first embodiment and can reliably prevent the converter from supplying power from the system power supply to the DC bus even though the AC motor is regenerating power.

Third Embodiment

Figure 16:
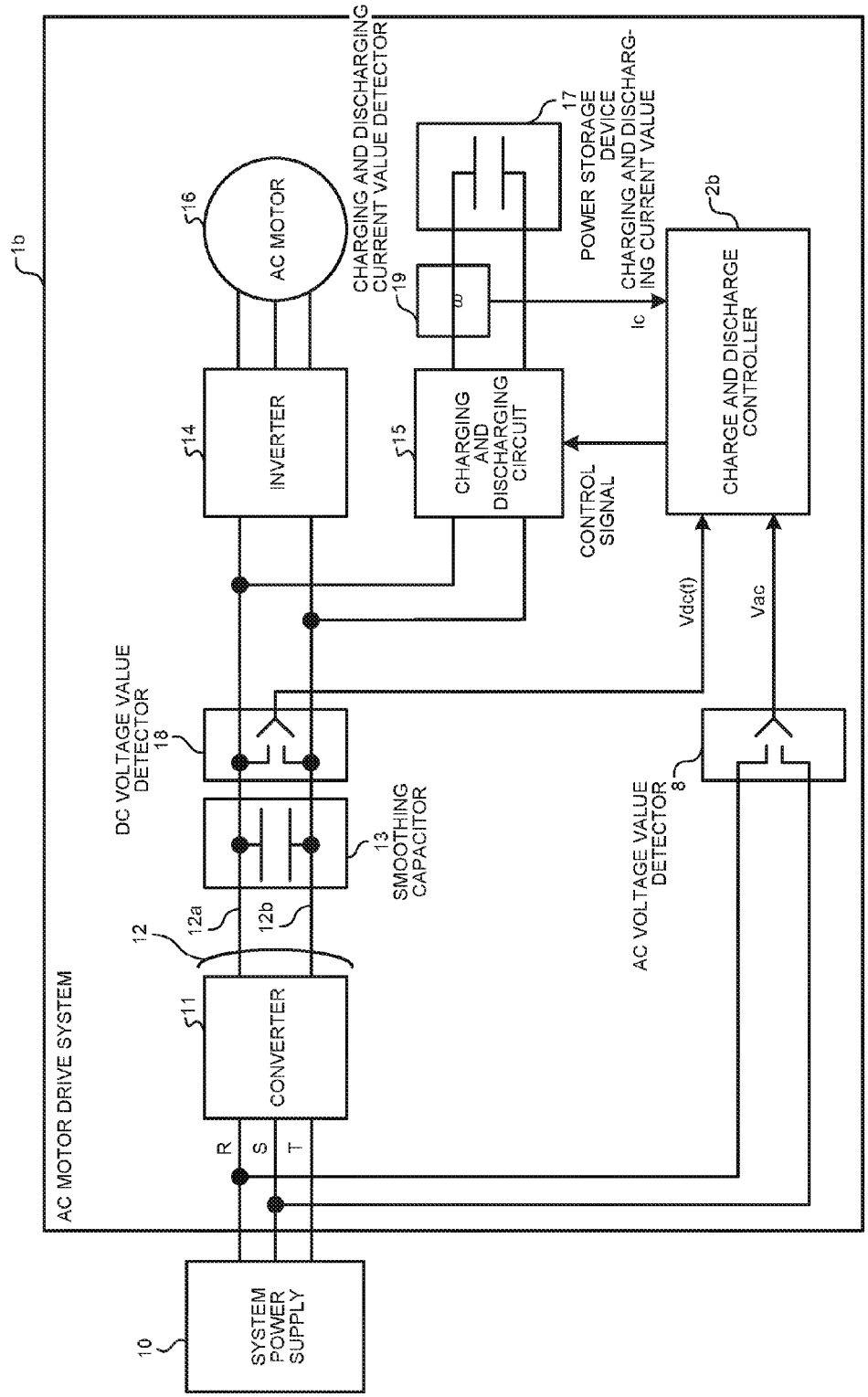
FIG. 16 is a block diagram illustrating the entire configuration of an AC motor drive system according to a third embodiment.

FIG. 16 is a block diagram illustrating the entire configuration of a third embodiment of an AC motor drive system according to the present invention. An AC motor drive system 1b illustrated in FIG. 16 includes a charge and discharge controller 2b, an AC voltage value detector 8, the converter 11, the DC bus 12, the smoothing capacitor 13, the inverter 14, the charging and discharging circuit 15, the AC motor 16, the power storage device 17, the DC voltage value detector 18, and the charging and discharging current value detector 19. The AC motor drive system 1b in the present embodiment illustrated in FIG. 16 is different from the AC motor drive system 1 in the first embodiment illustrated in FIG. 1 in that it includes the AC voltage value detector 8 and the charge and discharge controller 2b that is fed with an AC voltage value Vac, which is the output of the AC voltage value detector 8. The AC voltage value detector 8 is connected on the system power supply 10 side of the converter 11, detects the AC voltage value Vac, which is the voltage value across wiring from the system power supply 10, and outputs it to the charge and discharge controller 2b. In the present embodiment, for components identical or equivalent to those in the first embodiment, identical names and numerals are used and description thereof is omitted.

The AC voltage value Vac in the system power supply 10 input to the converter 11 depends on the length of wiring from the system power supply 10 to the converter 11. When a plurality of AC motor drive systems are connected to the same system power supply, the AC voltage value Vac input to the converter 11 of one AC motor drive system varies depending on the operation status (peak or off) of other AC motor drive systems. When the AC voltage value Vac in the converter 11 varies, a DC bus voltage value Vdc(t) of the DC bus 12 and a no-load-time DC bus voltage value Vdc0, which are the outputs of the converter 11, also vary. The AC motor drive system 1b in the present embodiment has an object of preventing the converter 11 from supplying power from the system power supply 10 to the DC bus 12 while the AC motor 16 is regenerating power, even when an averaged DC bus voltage value Vdc at converter regeneration time, which accommodates variations of the AC voltage value Vac output from the AC voltage value detector 8, is lower than the no-load-time DC bus voltage value Vdc0.

The charge and discharge controller 2b in the present embodiment includes a powering-time controller 21b in place of the powering-time controller 21 in the charge and discharge controller 2 in the first embodiment, and includes a regeneration-time controller 3b in place of the regeneration-time controller 3. The powering-time controller 21b in the present embodiment is different in that it is fed with the AC voltage value Vac in addition to the DC bus voltage value Vdc(t). The regeneration-time controller 3b in the present embodiment is different in that it is fed with the AC voltage value Vac in addition to the DC bus voltage value Vdc(t), it includes a charging current command value generator 4b in place of the charging current command value generator 4, and it includes a regeneration-time power/voltage converter 6b in place of the regeneration-time power/voltage converter 6. The charging current command value generator 4b and the regeneration-time power/voltage converter 6b in the present embodiment are fed with the AC voltage value Vac. The charging current command value generator 4b in the present embodiment is different in that it includes a regeneration-time charging current command value suppressor 45b in place of the regeneration-time charging current command value suppressor 45. The regeneration-time charging current command value suppressor 45b in the present embodiment is different in that it is fed with the AC voltage value Vac in addition to the DC bus voltage value Vdc(t), the regeneration-time DC bus voltage command value VthA, and a regeneration-time power compensation operation flag Fa. Thus, the AC voltage value Vac is input only to the powering-time controller 21b, the regeneration-time charging current command value suppressor 45b, and the regeneration-time power/voltage converter 6b.

Figure 17:
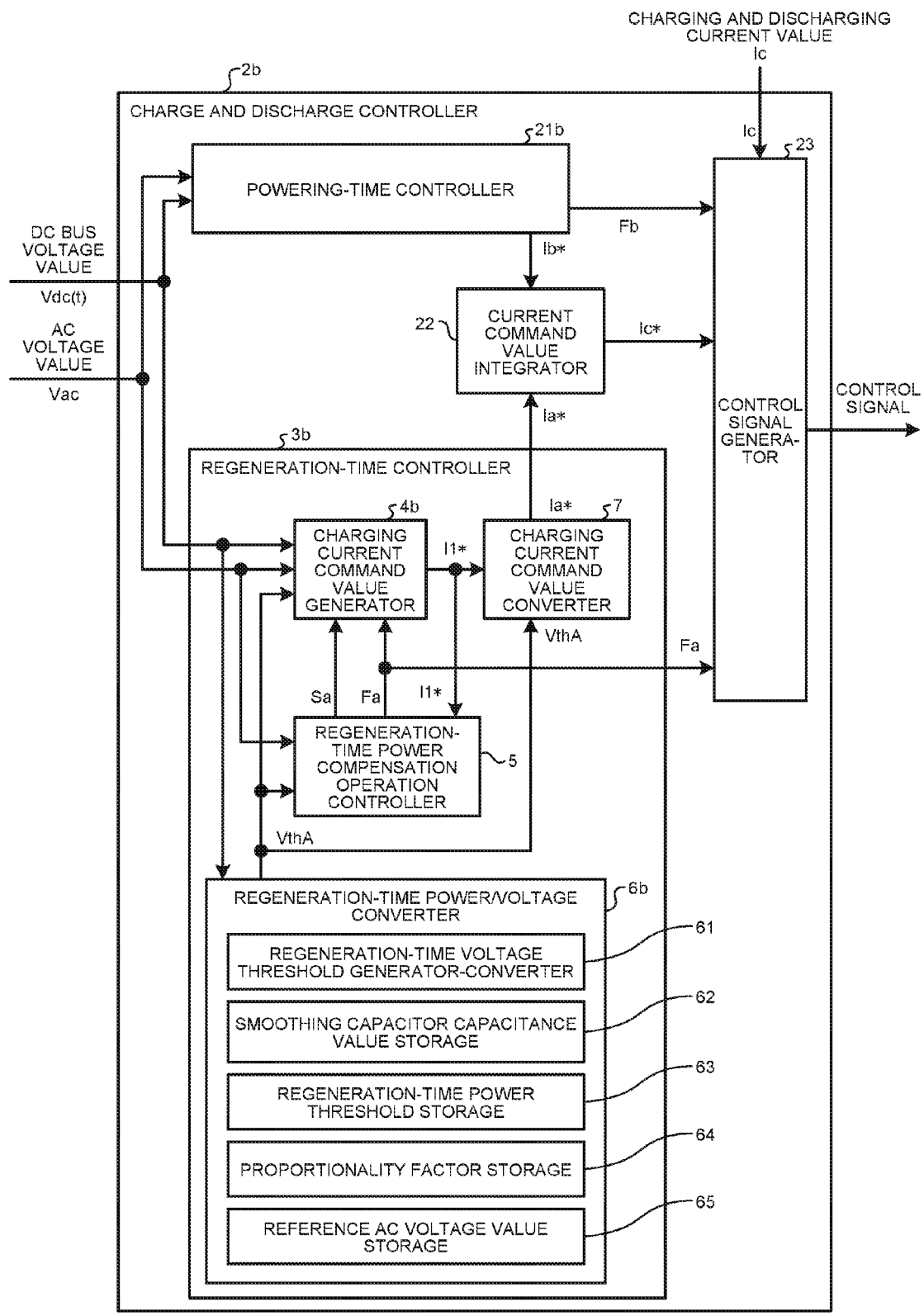
FIG. 17 is a block diagram illustrating a charge and discharge controller according to the third embodiment.

The relationship between power passing through the converter and the averaged DC bus voltage value Vdc illustrated in FIG. 4 is substantially translated in a DC bus voltage value direction (vertical axis direction in FIG. 4) due to change in the AC voltage value Vac. When the amount of variation of the AC voltage value Vac is about ±20% of a reference AC voltage value Vac0, the translation amount of the relationship between the power passing through the converter and the averaged DC bus voltage value Vdc is proportional to the ratio between the AC voltage value Vac and the reference AC voltage value Vac0, i.e., the value of (Vac/Vac0). Therefore, the power passing through the converter 11 and the relationship between the power and the averaged DC bus voltage value Vdc in the case of the reference AC voltage value Vac0 are stored in the regeneration-time voltage threshold generator-converter 61 in the regeneration-time power/voltage converter 6b. FIG. 17 is a block diagram illustrating the charge and discharge controller 2b. The regeneration-time power/voltage converter 6b illustrated in FIG. 17 includes a proportionality factor storage 64 and a reference AC voltage value storage 65 in addition to the regeneration-time voltage threshold generator-converter 61, the smoothing capacitor capacitance value storage 62, and the regeneration-time power threshold storage 63. The proportionality factor storage 64 stores a proportionality factor Ka with respect to (Vac/Vac0) of the translation amount of the relationship between the power passing through the converter 11 and the averaged DC bus voltage value Vdc. The reference AC voltage value storage 65 stores the value Vac0. By multiplying the output value of the regeneration-time voltage threshold generator-converter 61 by the AC voltage value Vac input to the regeneration-time power/voltage converter 6b, then multiplying the result by the proportionality factor Ka, which is the output value of the proportionality factor storage 64, and then dividing the result by the value Vac0, which is the output value of the reference AC voltage value storage 65, the regeneration-time DC bus voltage command value VthA, which is the output value of the regeneration-time power/voltage converter 6b, becomes a voltage threshold accommodating a variation of the AC voltage value Vac. Power passing through the converter 11 and the relationship between the power and the averaged DC bus voltage value Vdc in the case of the reference AC voltage value Vac0 are stored, using an approximate expression, a look-up table, or the like in the regeneration-time voltage threshold generator-converter 61.

In order to eliminate division that is a complicated calculation, there is a method of storing a value obtained by dividing a value of the averaged DC bus voltage value Vdc corresponding to power passing through the converter 11 in the case of the reference AC voltage value Vac0 by the reference AC voltage value Vac0, using an approximate expression, a look-up table, or the like in the regeneration-time voltage threshold generator-converter 61 in advance, and thus obtaining the regeneration-time DC bus voltage command value VthA by multiplying the output of the regeneration-time voltage threshold generator-converter 61 by the AC voltage value Vac and the proportionality factor Ka, thereby eliminating a division unit. At this time, the reference AC voltage value storage 65 is unnecessary.

Figure 18:
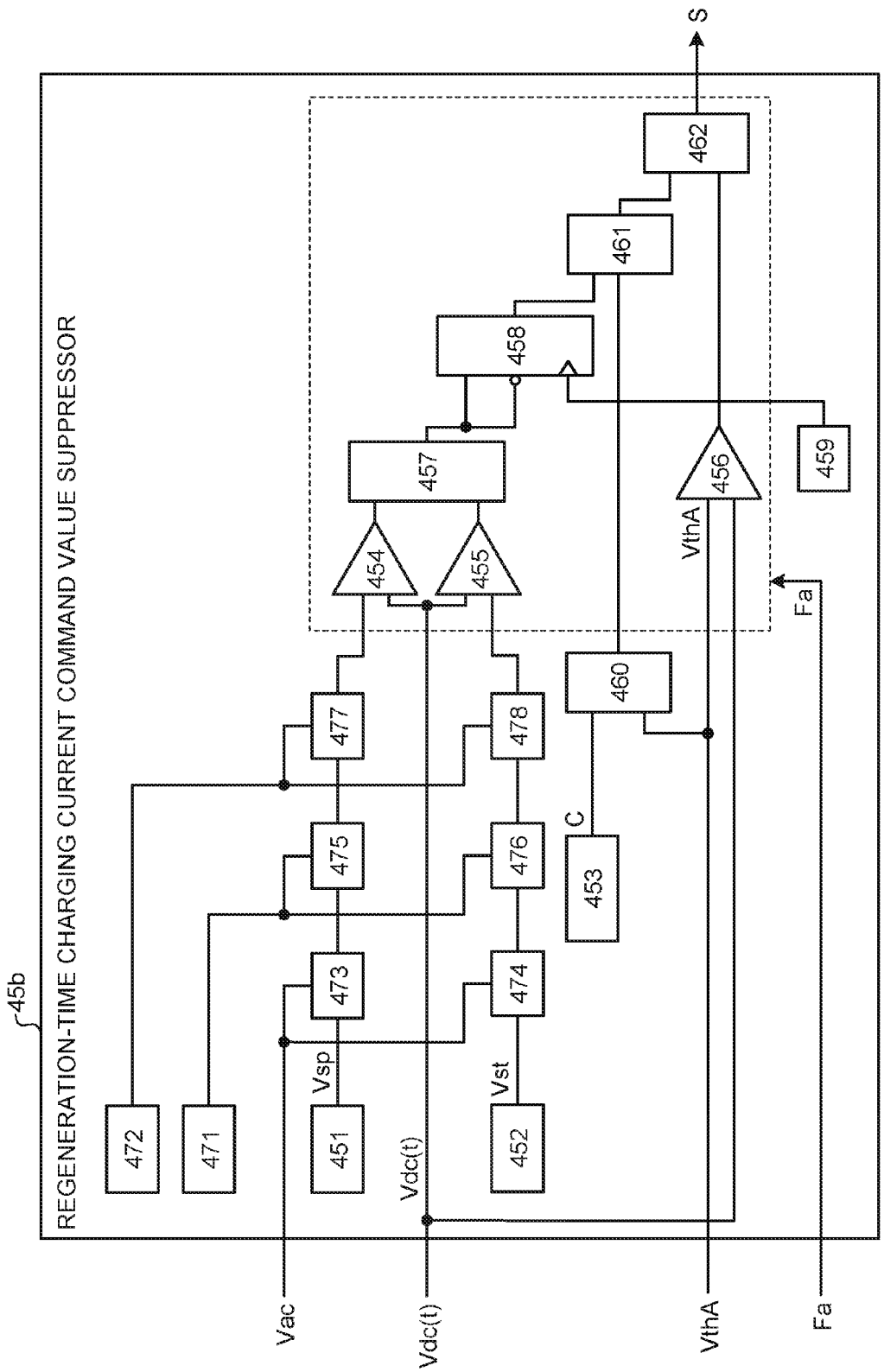
FIG. 18 is a block diagram illustrating a regeneration-time charging current command value suppressor according to the third embodiment.

FIG. 18 is a block diagram illustrating the regeneration-time charging current command value suppressor 45b. The regeneration-time charging current command value suppressor 45b illustrated in FIG. 18 includes the regeneration end voltage threshold storage 451, the regeneration start voltage threshold storage 452, the smoothing capacitor capacitance value storage 453, the first comparator 454, the second comparator 455, the third comparator 456, the first signal generator 457, the counter 458, the transmitter 459, the T0 calculator 460, the fourth comparator 461, the second signal generator 462, a proportionality factor storage 471, a reference AC voltage value storage 472, multipliers 473, 474, 475, and 476, and dividers 477 and 478. The regeneration-time charging current command value suppressor 45b in the present embodiment is different from the regeneration-time charging current command value suppressor 45 in the first embodiment in that it includes the proportionality factor storage 471 and the reference AC voltage value storage 472 that are newly provided, the multipliers 473 and 475 and the divider 477 interposed between the regeneration end voltage threshold storage 451 and the first comparator 454, and the multipliers 474 and 476 and the divider 478 interposed between the regeneration start voltage threshold storage 452 and the second comparator 455. The multiplier 473 and the multiplier 474 are fed with the AC voltage value Vac.

The proportionality factor storage 471 stores the proportionality factor Ka with respect to (Vac/Vac0) of the translation amount of the relationship between power passing through the converter 11 and the averaged DC bus voltage value Vdc. The proportionality factor Ka, which is the output of the proportionality factor storage 471, is output to the multipliers 475 and 476. The reference AC voltage value storage 472 stores the reference AC voltage value Vac0. The reference AC voltage value Vac0, which is the output of the reference AC voltage value storage 472, is output to a divisor terminal of the dividers 477 and 478. The multiplier 473 calculates the product Vsp–Vac of a voltage value Vsp slightly higher than a regeneration end voltage threshold, which is the output of the regeneration end voltage threshold storage 451, and the AC voltage value Vac, which is the output of the AC voltage value detector 8, and outputs it to the multiplier 475. The multiplier 474 calculates the product Vst·Vac of a voltage value Vst slightly lower than a regeneration start voltage threshold, which is the output of the regeneration start voltage threshold storage 452, and the AC voltage value Vac, which is the output of the AC voltage value detector 8, and outputs it to the multiplier 476. The multiplier 475 calculates the product Ka·Vsp·Vac of the product Vsp·Vac and the proportionality factor Ka, which is the output of the proportionality factor storage 471, and outputs it to a dividend terminal of the divider 477. The multiplier 476 calculates the product Ka·Vst·Vac of the product Vst·Vac and the proportionality factor Ka, which is the output of the proportionality factor storage 471, and outputs it to a dividend terminal of the divider 478. The divider 477 performs division with the product Ka·Vsp·Vac as a dividend and with the reference AC voltage value Vac0, which is the output value of the reference AC voltage value storage 472, as a divisor, and outputs the quotient Ka·(Vac/Vac0)·Vsp to the first comparator 454. The divider 478 performs division with the product Ka·Vst·Vac as a dividend and with the reference AC voltage value Vac0, which is the output value of the reference AC voltage value storage 472, as a divisor, and outputs the quotient Ka·(Vac/Vac0)Vst to the second comparator 455.

The first comparator 454 receives input of the quotient Ka·(Vac/Vac0)·Vsp and the DC bus voltage value Vdc(t), and generates a regeneration end signal Psp that becomes valid when the DC bus voltage value Vdc(t) becomes the quotient Ka·(Vac/Vac0)·Vsp or lower. The first comparator 454 outputs the regeneration end signal Psp to the first signal generator 457. The second comparator 455 receives input of the quotient Ka·(Vac/Vac0)·Vst and the DC bus voltage value Vdc(t), and generates a regeneration start signal Pst that becomes valid when the DC bus voltage value Vdc(t) becomes the quotient Ka·(Vac/Vac0)·Vst or higher. The second comparator 455 outputs the regeneration start signal Pst to the first signal generator 457.

The first comparator 454 is fed with the DC bus voltage value Vdc(t) having a variation of the AC voltage value Vac, and it is also fed with the quotient Ka·(Vac/Vac0)·Vsp with the variation of the AC voltage value Vac taken into account for the voltage value Vsp for a target for comparison with the DC bus voltage value Vdc(t). Therefore, the regeneration end signal Psp, which is the output of the first comparator 454, can accurately estimate a regeneration end time of the converter 11.

The second comparator 455 is fed with the DC bus voltage value Vdc(t) having a variation of the AC voltage value Vac, and it is also fed with the quotient Ka·(Vac/Vac0)·Vst with the variation of the AC voltage value Vac taken into account for the voltage value Vst for a target for comparison with the DC bus voltage value Vdc(t). Therefore, the regeneration start signal Pst, which is the output of the second comparator 455, can accurately estimate a regeneration start time of the converter 11. From the regeneration end signal Psp and the regeneration start signal Pst, which are two inputs of the first signal generator 457, to a regeneration-time charging-current-command-value suppression flag S, which is the output of the second signal generator 462, the smoothing capacitor capacitance value storage 453, the third comparator 456, the transmitter 459, and the T0 calculator 460 operate in a similar manner to those in the first embodiment.

The proportionality factor storage 64 in the regeneration-time power/voltage converter 6b and the proportionality factor storage 471 in the regeneration-time charging current command value suppressor 45b may be consolidated into one of them. The reference AC voltage value storage 65 in the regeneration-time power/voltage converter 6b and the reference AC voltage value storage 472 in the regeneration-time charging current command value suppressor 45b may be consolidated into one of them. The smoothing capacitor capacitance value storage 62 in the regeneration-time power/voltage converter 6b and the smoothing capacitor capacitance value storage 453 in the regeneration-time charging current command value suppressor 45b may be consolidated into one of them.

In the present embodiment, the powering-time controller 21b, the current command value integrator 22, the control signal generator 23, or the regeneration-time controller 3b may be implemented by hardware or may be implemented by software.

The AC motor drive system 1b according to the present embodiment, which is configured in the above manner, thus can, in addition to the effects of the first embodiment, prevent the converter 11 from supplying power from the system power supply 10 to the DC bus 12 while the AC motor 16 is regenerating power even when the voltage of the system power supply 10 varies.

The present embodiment has been described above in comparison with the first embodiment. However, it is clear that the technique in the present embodiment can be introduced into the second embodiment using the converter 11a.

Although the present embodiment has been described in comparison with the first embodiment, the present embodiment may be applied to the AC motor drive system in the second embodiment. The configuration described in the present embodiment can be combined with those of the first and second embodiments.

Fourth Embodiment

Figure 19:
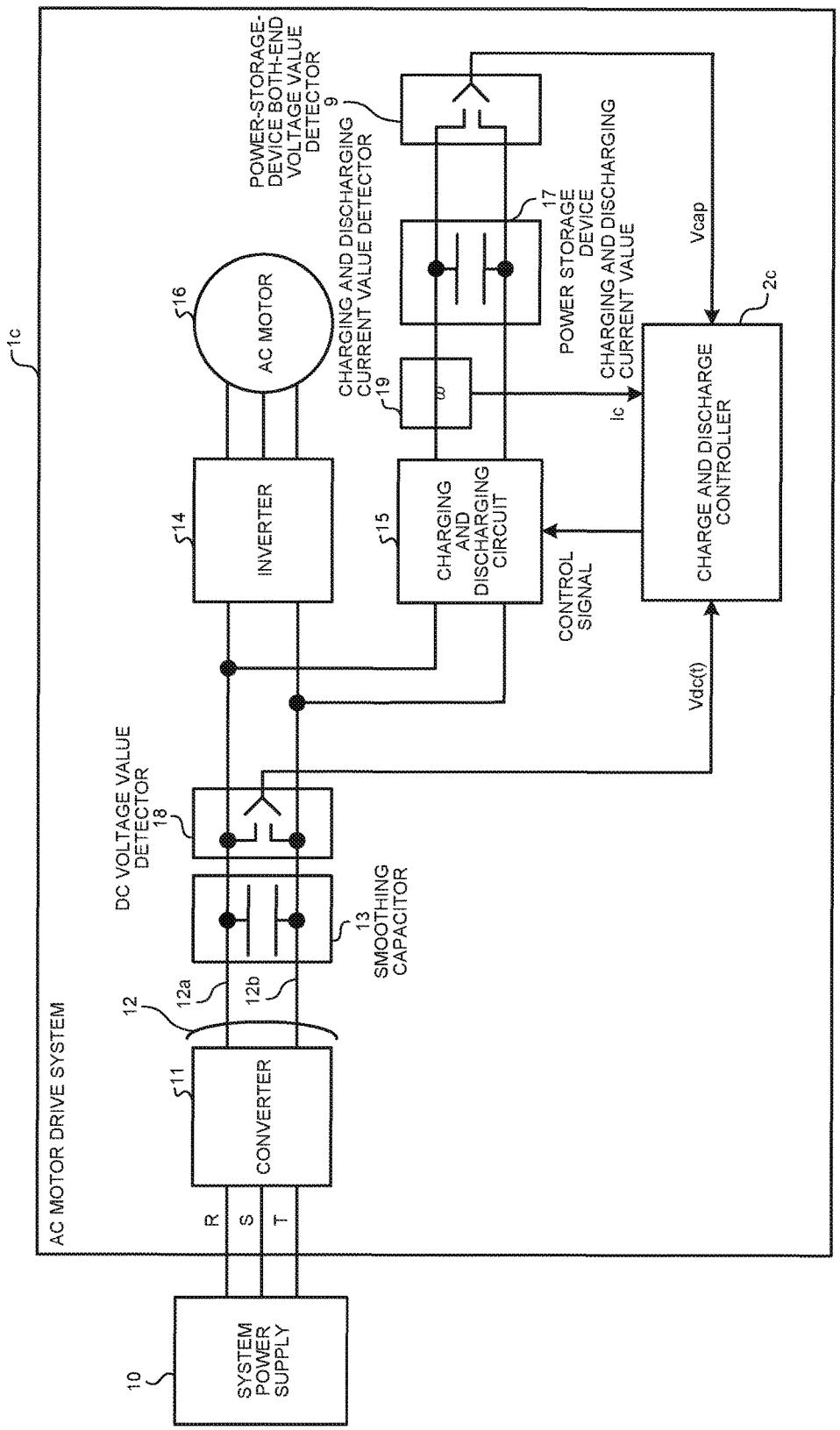
FIG. 19 is a block diagram illustrating the entire configuration of an AC motor drive system according to a fourth embodiment.

The first embodiment has been described in the case where the substitute both-end voltage value Vcfix is used as a substitute for the both-end voltage value Vcap of the power storage device 17. However, some AC motor drive systems detect the both-end voltage value Vcap of the power storage device 17 (with a power-storage-device both-end-voltage-value detector) to limit charge and discharge to and from the power storage device 17. FIG. 19 is a block diagram illustrating the entire configuration of the fourth embodiment of an AC motor drive system according to the present invention. When no cost increase arises from the installation of a power-storage-device both-end-voltage-value detector, as illustrated in FIG. 19, a power-storage-device both-end-voltage-value detector 9 may be installed to output a both-end voltage value Vcap detected by the power-storage-device both-end-voltage-value detector 9 to a charge and discharge controller 2c. In this case, the both-end voltage value Vcap is input to a powering-time controller and a regeneration-time controller in the charge and discharge controller 2c. The both-end voltage value Vcap input to the regeneration-time controller is input to a charging and discharging current command value converter, and Expression (4) described in the first embodiment is used. Alternatively, there is a method of inputting the both-end voltage value Vcap to the charging and discharging current command value converter, providing a conversion unit such as a look-up table to output a reciprocal of the both-end voltage value Vcap in the charging and discharging current command value converter, and using a method corresponding to Expression (5) described in the first embodiment to eliminate division, thereby obtaining a power-storage-device-side charging current command value Ia*.

The AC motor drive system 1c in the present embodiment can obtain the power-storage-device-side charging current command value Ia* that is more accurate than that of the AC motor drive system in the first embodiment. Therefore, the gain of PID control of the charging current command value generator 4 in the regeneration-time controller can be increased to provide an AC motor drive system with good responsivity.

Although the present embodiment has been described in comparison with the first embodiment, the present embodiment may be applied to the AC motor drive system in the second embodiment. The present embodiment may be applied to the AC motor drive system in the third embodiment. That is, the configuration described in the present embodiment can be combined with those in the first to third embodiments.

INDUSTRIAL APPLICABILITY

As above, the AC motor drive system according to the present invention is useful for an AC motor drive system including an AC motor that is connected to a system power supply to operate.

REFERENCE SIGNS LIST

1, 1a, 1b, 1c AC motor drive system, 2, 2a, 2b, 2c charge and discharge controller, 3, 3b regeneration-time controller, 4, 4b charging current command value generator, 5 regeneration-time power compensation operation controller, 6, 6b regeneration-time power/voltage converter, 7 charging current command value converter, 8 AC voltage value detector, 9 power-storage-device both-end-voltage-value detector, 10 system power supply, 11, 11a converter, 12 DC bus, 12a high-potential-side DC bus, 12b low-potential-side DC bus, 13 smoothing capacitor, 14 inverter, 15 charging and discharging circuit, 16 AC motor, 17 power storage device, DC voltage value detector, 19 charging and discharging current value detector, 21, 21b powering-time controller, current command value integrator, 23 control signal generator, 45, 45a, 45b regeneration-time charging current command value suppressor, 61 regeneration-time voltage threshold generator-converter, 62 smoothing capacitor capacitance value storage, 63 regeneration-time power threshold storage, 64 proportionality factor storage, 65 reference AC voltage value storage, 411 first subtractor, 412 first multiplier, 413 first switch, 414 first limiter, 415 second switch, 421 second multiplier, 422 third switch, 423 first adder, 424 second limiter, 425 fourth switch, 426 first delay device, 427 regeneration-time current-command-value-integral-component initial value generator, 431 second delay device, 432 second subtractor, 433 third multiplier, 434 third limiter, 435 fifth switch, 441 second adder, 442 fourth limiter, 443 sixth switch, 451 regeneration end voltage threshold storage, 452 regeneration start voltage threshold storage, 453 smoothing capacitor capacitance value storage, 454 first comparator, 455 second comparator, 456 third comparator, 457 first signal generator, 458 counter, 459 transmitter, 460 T0 calculator, 461 fourth comparator, 462 second signal generator, 463 inverter, 471 proportionality factor storage, 472 reference AC voltage value storage, 473, 474, 475, 476 multiplier, 477, 478 divider.

The invention claimed is:
1. An AC motor drive system comprising:
a converter that supplies DC power;
an inverter that converts the DC power into AC power;
a DC bus that connects the converter and the inverter;
an AC motor that is driven by the AC power;
a DC voltage value detector that detects a DC voltage value on an output side of the converter;
a power storage device that stores the DC power from the DC bus and releases the stored DC power to the DC bus;
a charging and discharging circuit that is connected to the DC bus and is in parallel with the inverter, and charges and discharges the power storage device;
a charging and discharging current value detector that detects a charging and discharging current value of the power storage device; and
a charge and discharge controller that outputs a control signal to control the charging and discharging circuit on a basis of the DC voltage value and the charging and discharging current value, wherein
when regenerative power from the AC motor via the inverter exceeds a predetermined power threshold, the charge and discharge controller causes the power storage device to be charged such that the DC voltage value becomes a voltage threshold corresponding to the power threshold,
when the regenerative power is lower than or equal to the power threshold, the converter performs a regeneration operation when the DC voltage value rises to reach a predetermined regeneration start voltage threshold and ends the regeneration operation when the DC voltage value drops to reach a predetermined regeneration end voltage threshold,
a time average value of the DC voltage value during the regeneration operation in the converter is lower than the DC voltage value at no-load time when the converter does not perform power supply and regeneration, and
the charge and discharge controller maintains constant current with which the power storage device is charged only during a period based on a cycle in which the DC bus voltage value reaches a voltage threshold based on a DC bus voltage value at which the converter starts the regeneration operation.

2. The AC motor drive system according to claim 1, wherein the period based on the cycle in which the DC bus voltage value reaches the voltage threshold based on the DC bus voltage value at which the converter starts the regeneration operation, starts at a time when a time after the DC bus voltage value reaches the regeneration end voltage threshold exceeds a preset time based on the voltage threshold corresponding to the power threshold, and ends at a time when the DC bus voltage value next reaches the voltage threshold corresponding to the power threshold.

3. The AC motor drive system according to claim 1, further comprising an AC voltage value detector that is connected on a power supply side of the converter and detects a line voltage value in power supply lines between the power supply and the converter, wherein
the AC voltage value detector outputs the detected line voltage value between the power supply lines to the charge and discharge controller.

4. The AC motor drive system according to claim 1, further comprising a power-storage-device both-end-voltage-value detector that is connected across an electrode of the power storage device and detects a voltage value across the power storage device, wherein
the power-storage-device both-end-voltage-value detector outputs the detected voltage value across the power storage device to the charge and discharge controller.

5. An AC motor drive system comprising:
a converter that supplies DC power;
an inverter that converts the DC power into AC power;
a DC bus that connects the converter and the inverter;
an AC motor that is driven by the AC power;
a DC voltage value detector that detects a DC voltage value on an output side of the converter;
a power storage device that stores the DC power from the DC bus and releases the stored DC power to the DC bus;
a charging and discharging circuit that is connected to the DC bus and is in parallel with the inverter, and charges and discharges the power storage device;
a charging and discharging current value detector that detects a charging and discharging current value of the power storage device; and
a charge and discharge controller that outputs a control signal to control the charging and discharging circuit on a basis of the DC voltage value and the charging and discharging current value, wherein
when regenerative power from the AC motor via the inverter exceeds a predetermined power threshold, the charge and discharge controller causes the power storage device to be charged such that the DC voltage value becomes a voltage threshold corresponding to the power threshold, when the regenerative power is lower than or equal to the power threshold, the converter performs a regeneration operation when the DC voltage value rises to reach a predetermined regeneration start voltage threshold and ends the regeneration operation when the DC voltage value drops to reach a predetermined regeneration end voltage threshold, a time average value of the DC voltage value during the regeneration operation in the converter is lower than the DC voltage value at no-load time when the converter does not perform power supply and regeneration, the converter outputs a regeneration period flag that is a signal indicating a period during which the converter actually regenerates power stored in the DC bus, the regeneration period flag is input to the charge and discharge controller, and the charge and discharge controller maintains constant current with which the power storage device is charged only during a period based on the regeneration period flag.

6. The AC motor drive system according to claim 5, wherein the period based on the regeneration period flag starts at a time when a time during which the regeneration period flag indicates that it is not a period to regenerate power exceeds a preset time based on the voltage threshold corresponding to the power threshold, and ends at a time when the DC bus voltage value next reaches the voltage threshold corresponding to the power threshold.

7. The AC motor drive system according to claim 5, further comprising an AC voltage value detector that is connected on a power supply side of the converter and detects a line voltage value in power supply lines between the power supply and the converter, wherein the AC voltage value detector outputs the detected line voltage value between the power supply lines to the charge and discharge controller.

8. The AC motor drive system according to claim 5, further comprising a power-storage-device both-end-voltage-value detector that is connected across an electrode of the power storage device and detects a voltage value across the power storage device, wherein the power-storage-device both-end-voltage-value detector outputs the detected voltage value across the power storage device to the charge and discharge controller.

* * * * *